(12) United States Patent
da Silva et al.

(10) Patent No.: US 11,743,844 B2
(45) Date of Patent: Aug. 29, 2023

(54) METHOD AND APPARATUS FOR NETWORK PLANNING AND OPERATION OF A BEAM-BASED COMMUNICATION SYSTEM

(71) Applicant: Telefonaktiebolaget LM Ericsson (publ), Stockholm (SE)

(72) Inventors: Icaro L. J. da Silva, Solna (SE); Reza Moosavi, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 789 days.

(21) Appl. No.: 16/324,731

(22) PCT Filed: Aug. 11, 2017

(86) PCT No.: PCT/EP2017/070505
§ 371 (c)(1),
(2) Date: Feb. 11, 2019

(87) PCT Pub. No.: WO2018/029364
PCT Pub. Date: Feb. 15, 2018

(65) Prior Publication Data
US 2019/0174436 A1    Jun. 6, 2019

Related U.S. Application Data

(60) Provisional application No. 62/374,444, filed on Aug. 12, 2016.

(51) Int. Cl.
*H04W 56/00* (2009.01)
*H04B 7/06* (2006.01)
(Continued)

(52) U.S. Cl.
CPC .......... *H04W 56/00* (2013.01); *H04B 7/0695* (2013.01); *H04L 5/005* (2013.01);
(Continued)

(58) Field of Classification Search
None
See application file for complete search history.

(56) References Cited

U.S. PATENT DOCUMENTS

2016/0087765 A1    3/2016  Guey et al.
2016/0323757 A1*  11/2016  Braun .................. H04W 16/28
(Continued)

FOREIGN PATENT DOCUMENTS

CN    104160758 A    11/2014
EP    3051906 A1    8/2016
(Continued)

OTHER PUBLICATIONS

Mwanje, Stephen S., et al., "On the Limits of PCT Auto Configuration and Reuse in 4G/5G Ultra Dense Networks", 2015 11th International Conference on Network and Service Management; IFIP; CNSM Mini-Conference Paper, Nov. 9, 2015, 92-98.

(Continued)

*Primary Examiner* — Chi H Pham
*Assistant Examiner* — Raul Rivas
(74) *Attorney, Agent, or Firm* — Murphy, Bilak & Homiller, PLLC

(57) ABSTRACT

In one aspect, network node operates in a wireless communications network that includes two or more beam-based transmission points (30), where each of the two or more beam-based transmission points transmits synchronization signals corresponding to beams transmitted by the respective transmission point. The network node configures the two or more beam-based transmission points to use non-conflicting radio resources for their respective transmissions of synchronization signals.

20 Claims, 23 Drawing Sheets

(51) Int. Cl.
    *H04W 16/28*    (2009.01)
    *H04W 16/12*    (2009.01)
    *H04L 27/26*    (2006.01)
    *H04L 5/00*     (2006.01)
    *H04W 24/10*    (2009.01)

(52) U.S. Cl.
    CPC ........ *H04L 5/0023* (2013.01); *H04L 27/2613* (2013.01); *H04W 16/12* (2013.01); *H04W 16/28* (2013.01); *H04W 24/10* (2013.01); *H04B 7/0639* (2013.01)

(56) References Cited

U.S. PATENT DOCUMENTS

2017/0142604 A1*  5/2017  Reial ................. H04W 24/10
2017/0288822 A1* 10/2017  Lagerqvist ........... H04L 5/0007
2018/0287845 A1* 10/2018  Kim ................. H04W 72/0406

FOREIGN PATENT DOCUMENTS

WO    2016157059 A1    10/2016
WO    2017065548 A1     4/2017
WO    2017083514 A1     5/2017

OTHER PUBLICATIONS

Säily, Mikko, et al., "Deliverable D6.1 Draft Asynchronous Control Functions and Overall Control Plane Design", METIS II; Version: v1.0; http://www.5g-ppp.eu/, Jun. 30, 2016, 1-120.
Unknown, Author, "New SID Proposal: Study on New Radio Access Technology", 3GPP TSG RAN Meeting #71 RP-160671 Göteborg, Sweden, Source: NTT DOCOMO, Mar. 7-10, 2016, 1-8.

\* cited by examiner

Cells B and C have the same frequency and PCI.
Cells B and C are neighboring cells of Cell A

| color group | 0 | 1 | 2 | ...... | 162 | 163 | 164 | 165 | 166 | 167 |
|---|---|---|---|---|---|---|---|---|---|---|
| 0 | 0 | 3 | 6 | ...... | 486 | 489 | 492 | 495 | 498 | 501 |
| 1 | 4 | 7 | 10 | ...... | 490 | 493 | 496 | 499 | 502 | 1 |
| 2 | 8 | 11 | 14 | ...... | 494 | 497 | 500 | 503 | 2 | 5 |

PCIs derived from PSSs/SSSs and their color code

1100

CONFIGURE TWO OR MORE BEAM-BASED TRANSMISSION POINTS IN A WIRELESS COMMUNICATION NETWORK TO USE NON-CONFLICTING RADIO RESOURCES FOR THEIR RESPECTIVE TRANSMISSIONS OF SYNCHRONIZATION SIGNALS, WHERE EACH TRANSMISSION POINT TRANSMITS A NUMBER OF SYNCHRONIZATION SIGNALS CORRESPONDING TO BEAMS USED BY THE TRANSMISSION POINT IN ANTENNA BEAMFORMING
1102

ASSIGN IDENTIFIERS OR OTHER CONFIGURED VALUES TO THE TRANSMISSION POINTS ACCORDING TO AN ASSIGNMENT SCHEME THAT AVOIDS USING THE SAME IDENTIFIER OR VALUE FOR GEOGRAPHICALLY NEIGHBORING TRANSMISSION POINTS AT LEAST WITHIN A GIVEN COVERAGE AREA OF THE WIRELESS COMMUNICATION NETWORK
1112

CONFIGURE EACH TRANSMISSION POINT TO SELECT THE PARTICULAR RADIO RESOURCES USED FOR TRANSMISSION OF THE SYNCHRONIZATION SIGNALS AS A FUNCTION OF THE ASSIGNED IDENTIFIER OR VALUE, SUCH THAT TRANSMISSION POINTS HAVING DIFFERENT ASSIGNED IDENTIFIERS/VALUES CHOOSE DIFFERENT RADIO RESOURCES FOR TRANSMISSION OF THEIR RESPECTIVE SYNCHRONIZATION SIGNALS
1114

```
┌─────────────────────────────────────────┐
│ SELECTING RADIO RESOURCES IN DEPENDENCE ON AN │
│ ASSIGNED IDENTIFIER OR OTHER CONFIGURED VALUE AT │
│       THE TRANSMISSION POINT            │
│                 1302                    │
└─────────────────────────────────────────┘
                    │
                    ▼
┌─────────────────────────────────────────┐
│ TRANSMITTING SYNCHRONIZATION SIGNALS USING THE │
│ SELECTED RADIO RESOURCES, THE SYNCHRONIZATION │
│ SIGNALS BEING TRANSMITTED IN ASSOCIATION WITH TWO │
│ OR MORE BEAMS USED BY THE TRANSMISSION POINT IN │
│          ANTENNA BEAMFORMING            │
│                 1304                    │
└─────────────────────────────────────────┘
```

*FIG. 13*

1500

```
IDENTIFY A SUBSET OF RADIO RESOURCES TO USE
WHEN SEARCHING FOR SYNCHRONIZATION SIGNAL
TRANSMISSIONS FROM A NEIGHBORING TRANSMISSION
POINT, ACCORDING TO A KNOWN RELATIONSHIP TO A
SUBSET OF RADIO RESOURCES DETERMINED BY THE
WIRELESS DEVICE AS BEING USED BY A FIRST
TRANSMISSION POINT FOR SYNCHRONIZATION SIGNAL
TRANSMISSION
1502
```

```
SEARCH FOR SYNCHRONIZATION SIGNAL
TRANSMISSIONS IN THE IDENTIFIED SUBSET OF RADIO
RESOURCES, WHERE EACH TRANSMISSION POINT
TRANSMITS A SET OF SYNCHRONIZATION SIGNALS
CORRESPONDING TO A SET OF CONFIGURED BEAMS
USED BY THE TRANSMISSION POINT FOR BEAMFORMING
TRANSMISSIONS
1504
```

*FIG. 15*

METHOD AND APPARATUS FOR NETWORK PLANNING AND OPERATION OF A BEAM-BASED COMMUNICATION SYSTEM

TECHNICAL FIELD

The present invention relates to communication systems, such as wireless communication networks, and particularly relates to network planning and operation of a beam-based communication system that includes two or more beam-based transmission points that transmit synchronization signals corresponding to beams transmitted by each transmission point.

BACKGROUND

In Long Term Evolution (LTE), a user equipment (UE) obtains time and frequency synchronization with a network cell. Three requirements for frequency and time synchronization in an LTE system include: symbol and frame timing, frequency synchronization, and sampling clock synchronization. Symbol and frame timing acquisition is how the correct symbol start position is determined. For example, the symbol and frame timing is used to set a Discrete Fourier Transform (DFT) window position. Frequency synchronization is required to reduce or eliminate the effect of frequency errors arising from a mismatch of local oscillators between the transmitter and receiver, as well as Doppler shift caused by any UE motion.

Signal sequences used for synchronization can encode a Cyclic Prefix (CP) length, the Physical Cell Identity (PCI) and whether the cell uses Frequency Domain Duplex (FDD) or Time Domain Duplex (TDD). Due to these properties, the sequences that include the PCI may allow the UE to have a clear synchronization reference in the downlink for both "RRC Idle" and "RRC Connected" procedures. In "RRC Idle", for example, synchronization allows the UE to camp on an LTE cell and possibly access this cell by sending a preamble to the Physical Random Access Channel (PRACH), whose configuration has been provided via system information associated with the cell.

A UE can obtain frequency and time synchronization with a cell in the downlink, based on the transmission of a Primary Synchronization Signal (PSS) and a Secondary Synchronization Signal (SSS) for the cell. These signals are always available, e.g., in designated resources within the recurring frames/subframes on the downlink.

The PSS and SSS structure in time is shown in FIG. 1 for the FDD case, and in FIG. 2 for TDD. The synchronization signals are transmitted periodically, twice per 10-millisecond radio frame. This allows the UEs to always be able to synchronize with any radio frame. In a FDD cell (FIG. 1), the PSS is always located in the last OFDM (Orthogonal Frequency Division Multiplexing) symbol of the first and 11th time slots of each radio frame, thus enabling the UE to acquire the slot boundary timing independently of the CP length. The SSS is located in the symbol immediately preceding the PSS, a design choice enabling coherent detection of the SSS relative to the PSS, based on the assumption that the channel coherence duration is significantly longer than one OFDM symbol.

In a TDD cell (FIG. 2), the PSS is located in the third symbol of the 3rd and 13th slots, while the SSS is located three symbols earlier. Coherent detection can be used under the assumption that the channel coherence time is significantly longer than four OFDM symbols. The precise position of the SSS changes depending on the length of the CP configured for the cell. At this stage of the cell detection process, the CP length is unknown a priori to the UE, and it is, therefore, blindly detected by checking for the SSS at the two possible positions. While the PSS in a given cell is the same in every subframe in which it is transmitted, the two SSS transmissions in each radio frame change in a specific manner, thus enabling the UE to establish the position of the 10-millisecond radio frame boundary.

In the frequency domain, the mapping of the PSS and SSS to subcarriers is shown in FIG. 3. The PSS and SSS are transmitted in the central six Resource Blocks (RBs), enabling the frequency mapping of the synchronization signals to be invariant with respect to the system bandwidth (which can in principle vary from 6 to 110 RBs to suit channel bandwidths between around 1.4 MHz and 20 MHz). This allows the UE to synchronize to the network without any a priori knowledge of the allocated bandwidth.

The particular sequences that are transmitted for the PSS and SSS in a given cell are used to indicate the physical layer cell identity (PCI) to the UE. There are 504 unique PCIs in LTE, grouped into 168 groups of three identities. The three identities in a group would usually be assigned to cells under the control of the same eNodeB. Three PSS sequences are used to indicate the cell identity within the group, and 168 SSS sequences are used to indicate the identity of the group.

The PCI is calculated by using PSS and SSS in the following formula where $SSS=N_{ID}^{(1)}$ indicates the physical cell identity group (0 to 167) and $PSS=N_{ID}^{(2)}$ indicates the cell identity within the group:

$$N_{ID}^{CELL}=3N_{ID}^{(1)}+N_{ID}^{(2)}$$

This arrangement creates 504 (168×3) unique physical cell identities. When many cells exist in an LTE system, some cells must share one PCI. A PCI conflict between neighboring cells may occur if PCIs are planned inappropriately or changed manually, or if neighboring cell parameters are modified.

Appropriate planning exists in order to avoid two potential problems: PCI collision and PCI confusion. A PCI collision occurs between two intra-frequency cells that use an identical PCI. In this case, UEs in the overlapping area of the two cells cannot implement signal synchronization or decoding. FIG. 4 shows a PCI collision at a UE between cell A and cell B.

The lack of proper PCI planning may also cause PCI confusion between a detected cell and a neighboring cell if the two cells have the same frequency and PCI, and if the reference signal received power (RSRP) of the two cells reaches the handover threshold. The PCI confusion may lead to UE handover failures or service drops. This confusion is illustrated in FIG. 5. If the UE does not support Automatic Neighbor Relation (ANR), the eNodeB cannot determine whether the detected cell is cell B or cell C based on the report by the UE. This may lead to a handover failure. If the UE supports ANR, the eNodeB can identify cell B based on the E-UTRAN cell global identifier (ECGI) reported by the UE. Then, a handover to cell B can be performed, if necessary.

There is a common understanding that "New Radio" (NR) will consider frequency ranges up to 100 GHz. In comparison to the current frequency bands allocated to LTE, some of the new bands will have much more challenging propagation properties, such as lower diffraction and higher outdoor/indoor penetration losses. As a consequence, signals will have less ability to propagate around corners and penetrate walls. In addition, in high frequency bands, atmospheric/rain attenuation and higher body losses render the coverage of NR signals even spottier. The operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will massively rely on beamforming to provide coverage. NR networks are, thus, examples of beam-based wireless communication networks.

It is recognized and appreciated herein that the collision probability and instances of "confusion" for synchronization signals being transmitted in a beam-based wireless communication network are to be minimized, e.g., to support automatic neighbor relation features.

SUMMARY

The methods and apparatuses disclosed herein simplify network planning by avoiding or minimizing the collision probability of a set of synchronization sequences to be used as a synchronization source by wireless devices in a wireless communication network. For example, each node/TRP/Cell may be associated with an identifier (e.g., access node ID, eNB ID, gNB, cell ID, etc.) that is used to scramble time-frequency-code resources and beam sweeping parameters differently, where multiple sets of synchronization sequences are transmitted by the same node and associated by the same ID. Other beam sweeping configurations may be adapted based on the ID, such as the priority order being directed to adjacent synchronization signals (e.g., MRSs) in adjacent subframes/OFDM symbols.

Among its several advantages, such an approach avoids the need for using fixed configurations for synchronization signal transmission from the various TPs in the network. That is, by configuring the TPs to use different radio resources (e.g., time/frequency resources), the approach avoids or minimizes synchronization signal collisions and confusion, and greatly reduces the amount of network planning necessary to deploy a beam-based system. In at least some embodiments, the approach is based on configuring the TPs to select the particular radio resources used for synchronization signal transmission in dependence on identifiers or other distinguishing parameters associated with the TPs, such that neighboring TPs having different values for their identifier or other parameter will select different radio resources as a consequence of the different values.

One method detailed herein involves operation in a network that includes two or more beam-based transmission points, where each of the two or more beam-based transmission points transmits synchronization signals corresponding to beams transmitted by the respective transmission point. The method comprises configuring the transmission points to use non-conflicting radio resources for their respective transmissions of synchronization signals. For example, each transmission point is configured to select the radio resources it uses for synchronization-signal transmission in dependence on the value of an identifier, and configuring the transmission points to use non-conflicting radio resources for their respective transmissions of synchronization signals comprises assigning different identifiers to the transmission points.

According to some embodiments, a network node, which may be a network planning node, for example, is adapted for operation in a wireless communications network that includes two or more beam-based transmission points, where each of the two or more beam-based transmission points transmits synchronization signals corresponding to beams transmitted by the respective transmission point. The network node includes communication interface circuitry configured to communicate with the two or more beam-based transmission points and processing circuitry operatively associated with the communication interface circuitry. The processing circuitry is configured to configure the two or more beam-based transmission points to use non-conflicting radio resources for their respective transmissions of synchronization signals.

Another example embodiment involves a method of operation by a transmission point in a wireless communication network comprising two or more beam-based transmission points. The method includes selecting radio resources, in dependence on an assigned identifier or other configured value. The method includes transmitting synchronization signals using the selected radio resources, the synchronization signals being transmitted in association with two or more beams transmitted by the transmission point. The transmission point, for example, beamforms transmissions according to a configured set of beams and transmits a synchronization signal for each beam, where the synchronization signal enables a receiving wireless device to perform synchronization measurements and/or received-signal strength or quality measurements.

An example transmission point is configured for operation in a wireless communication network comprising a plurality of such transmission points and includes transceiver and associated processing circuitry. The transceiver circuitry is configured for transmitting signals from an associated array of antennas or antenna elements and the processing circuitry is configured to select radio resources in dependence on an assigned identifier or other configured value and transmit synchronization signals using the selected radio resources, the synchronization signals being transmitted in association with two or more beams transmitted by the transmission point.

As for device-side aspects of the teachings herein, one example involves a method of operation in a wireless device configured for operation in a wireless communication network comprising two or more beam-based transmission points. Each of the two or more beam-based transmission points transmits synchronization signals corresponding to beams transmitted by the respective transmission point. The method includes receiving information from the network indicating a set of synchronization signals to use as synchronization sources, and maintaining synchronization with the wireless communication network based on detecting any one or more of the synchronization signals in the set.

In the same embodiment or in another embodiment, another method of operation in a wireless communication device includes identifying a subset of radio resources to use when searching for synchronization signal transmissions from a neighboring transmission point, according to a known relationship to a subset of radio resources being used by a first transmission point for synchronization signal transmission. The method further includes searching for synchronization signal transmissions in the identified subset of radio resources, where each transmission point transmits synchronization signals corresponding to beams transmitted by the transmission point.

In a related example, a wireless device is configured for operation in a wireless communication system comprising a plurality of transmission points. The wireless device includes transceiver circuitry and associated processing circuitry. The transceiver circuitry is configured to receive signals transmitted by the transmission points, and the processing circuitry is configured to identify a subset of radio resources to use when searching for synchronization signal transmissions from a neighboring transmission point, according to a known relationship to a subset of radio resources being used by a first transmission point for synchronization signal transmission and search for synchronization signal transmissions in the identified subset of radio resources. Here, each transmission point transmits synchronization signals corresponding to beams transmitted by the transmission point.

According to some embodiments, a wireless device configured for operation in a wireless communication network comprising two or more beam-based transmission points, wherein each of the two or more beam-based transmission points transmits synchronization signals corresponding to beams transmitted by the respective transmission point, comprises transceiver circuitry configured for communicating with the wireless communication network and processing circuitry operatively associated with the transceiver circuitry and configured to receive information from the wireless communications network indicating a set of synchronization signals to use as synchronization sources and maintain synchronization with the wireless communication network based on detecting any one or more of the synchronization signals in the set of synchronization signals.

Further aspects of the present invention are directed to an apparatus, computer program products or computer readable storage medium corresponding to the methods summarized above and functional implementations of the above-summarized apparatus and wireless device. An example embodiment provides a method of operation in a wireless communications network, wherein the communications network includes two or more beam-based transmission points. Each of the two or more beam-based transmission points transmits synchronization signals corresponding to beams transmitted by the respective transmission point. The method comprises configuring the two or more beam-based transmission points to use non-conflicting radio resources for their respective transmissions of synchronization signals.

Optionally, configuring the two or more beam-based transmission points comprises configuring the two or more beam-based transmission points to select synchronization signal transmission resources according to patterns or offsets that avoid synchronization signal collisions and confusion.

Optionally, each of the two or more beam-based transmission points is configured to select the radio resources used for synchronization signal transmission in dependence on a value of an identifier, and wherein configuring the two or more beam-based transmission points to use non-conflicting radio resources for their respective transmissions of synchronization signals comprises assigning different identifiers to the two or more beam-based transmission points.

Optionally, assigning the different identifiers to the two or more beam-based transmission points comprises assigning the different identifiers according to an assignment scheme that avoids using the same identifier for geographically neighboring ones of the two or more beam-based transmission points at least with a given coverage area of the wireless communications network.

An example embodiment provides a method of operation by a beam-based transmission point in a wireless communication network comprising two or more beam-based transmission points, the method comprises selecting radio resources in dependence on an assigned identifier or other configured value; and transmitting synchronization signals using the selected radio resources, the synchronization signals being transmitted in association with two or more beams transmitted by the transmission point.

Optionally, the transmission point beamforms transmissions according to a configured set of beams and transmits a synchronization signal for each beam, the synchronization signal enabling a receiving wireless device to perform synchronization measurements and/or received-signal strength or quality measurements.

Optionally, transmitting the synchronization signals comprises transmitting a synchronization signal for each beam, each such synchronization signal being based on a different synchronization sequence selected from a set of synchronization sequences configured for use by the transmission point, and wherein each synchronization signal serves as a signal synchronization and/or measurement source for wireless devices operating within a coverage area of the respective beam.

Optionally, the transmission point beamforms transmissions according to the configured set of beams, and wherein the method comprises performing beamforming transmissions of the synchronization signals according to a particular beam sweeping pattern or timing, and selecting or configuring the particular beam sweeping pattern or timing in dependence on the assigned identifier or other configured value at the transmission point.

Optionally, the transmission point uses a radio frame structure, wherein each radio frame comprises a number of physical resource blocks, PRBs, defined according to a time/frequency grid, and wherein selecting the radio resources comprises selecting the radio resources by choosing the PRBs to use for transmission of the synchronization signals.

Optionally, the transmission point derives a time shift and/or frequency shift as a function of the assigned identifier or other configured value, wherein the time shift and/or frequency shift control the radio resources selected by the transmission point for transmission of the synchronization signals.

Optionally, the synchronization signals comprise Mobility Reference Signals, MRSs, each MRS comprising a Time Synchronization Signal, TSS, and a Beam Reference Signal, BRS, and wherein each BRS uniquely identifies a beam in a configured set of beams used by the transmission point.

An example embodiment provides a method of operation in a wireless device configured for operation in a wireless communication network comprising two or more beam-based transmission points, wherein each of the two or more beam-based transmission points transmits synchronization signals corresponding to beams transmitted by the respective transmission point. The method comprising receiving information from the wireless communications network indicating a set of synchronization signals to use as synchronization sources; and maintaining synchronization with the wireless communication network based on detecting any one or more of the synchronization signals in the set of synchronization signals.

Optionally, maintaining synchronization with the wireless communication network comprises using a strongest or highest-quality one of the synchronization signals as the synchronization source.

Optionally, reporting a signal strength or other measurement for one or more synchronizations signals that are detected by the wireless device but not included in the set of synchronization signals.

An example embodiment provides a method of operation in a wireless device configured for operation in a wireless communication network that includes two or more beam-based transmission points, wherein each of the two or more beam-based transmission points transmits synchronization signals corresponding to beams transmitted by the respective transmission point. The method comprises identifying a subset of radio resources to use when searching for synchronization signal transmissions from a neighboring transmission point, according to a known relationship to a subset of radio resources being used by a first transmission point for synchronization signal transmission; and searching for synchronization signal transmissions in the identified subset of radio resources.

Optionally, the known relationship comprises a known offset in time and/or frequency, and wherein identifying the subset of radio resources comprises applying the known offset in time and/or frequency to a time and/or frequency associated with the subset of radio resources used by the first transmission point for synchronization signal transmission.

Optionally, determining the known relationship based on preconfigured information stored in the wireless device or from signaling received from the wireless communication network.

Optionally, further comprising identifying the subset of radio resources within a configured bandwidth, as configured for the wireless device by the wireless communication network.

An example embodiment provides a network node in a wireless communications network that includes two or more beam-based transmission points, where each of the two or more beam-based transmission points transmits synchronization signals corresponding to beams transmitted by the respective transmission point. The network node comprises communication interface circuitry configured to communicate with the two or more beam-based transmission points; and processing circuitry operatively associated with the communication interface circuitry and configured to configure the two or more beam-based transmission points to use non-conflicting radio resources for their respective transmissions of synchronization signals.

Optionally, the processing circuitry is configured to configure the two or more beam-based transmission points to select synchronization signal transmission resources according to patterns or offsets that avoid synchronization signal collisions and confusion.

Optionally, each of the two or more beam-based transmission points is configured to select the radio resources the network node uses for synchronization signal transmission in dependence on a value of an identifier, and wherein the processing circuitry is configured to configure the two or more beam-based transmission points to use non-conflicting radio resources for their respective transmissions of synchronization signals by assigning different identifiers to the two or more beam-based transmission points.

Optionally, the processing circuitry is configured to assign the different identifiers to the two or more beam-based transmission points by assigning the different identifiers according to an assignment scheme that avoids using the same identifier for geographically neighboring ones of the two or more beam-based transmission points at least with a given coverage area of the wireless communications network.

An example embodiment provides a beam-based transmission point in a wireless communication network comprising two or more beam-based transmission points. The beam-based transmission point comprising communication interface circuitry configured for communicating within the wireless communication network; transceiver circuitry configured for transmitting signals from an associated array of antennas or antenna element; and processing circuitry operatively associated with the communication interface circuitry and transceiver circuitry and configured to select radio resources in dependence on an assigned identifier or other configured value; and transmit synchronization signals using the selected radio resources, the synchronization signals being transmitted in association with two or more beams transmitted by the transmission point.

Optionally, the processing circuitry is configured to beamform transmissions according to a configured set of beams and transmits a synchronization signal for each beam, the synchronization signal enabling a receiving wireless device to perform synchronization measurements and/or received-signal strength or quality measurements.

Optionally, the processing circuitry is configured to transmit the synchronization signals by transmitting a synchronization signal for each beam, each such synchronization signal being based on a different synchronization sequence selected from a set of synchronization sequences configured for use by the transmission point, and wherein each synchronization signal serves as a signal synchronization and/or measurement source for wireless devices operating within a coverage area of the respective beam.

Optionally, the processing circuitry is configured to: beamform transmissions according to the configured set of beams; perform beamforming transmissions of the synchronization signals according to a particular beam sweeping pattern or timing; and select or configure the particular beam sweeping pattern or timing in dependence on the assigned identifier or other configured value at the transmission point.

Optionally, the processing circuitry is configured to use a radio frame structure, wherein each radio frame comprises a number of physical resource blocks, PRBs, defined according to a time/frequency grid, and select the radio resources by selecting the radio resources by choosing the PRBs to use for transmission of the synchronization signals.

Optionally, the processing circuitry is configured to derive a time shift and/or frequency shift as a function of the assigned identifier or other configured value, wherein the time shift and/or frequency shift control the radio resources selected by the transmission point for transmission of the synchronization signals.

Optionally, the synchronization signals comprise Mobility Reference Signals, MRSs, each MRS comprising a Time Synchronization Signal, TSS, and a Beam Reference Signal, BRS, and wherein each BRS uniquely identifies a beam in a configured set of beams used by the transmission point.

An example embodiment provides a wireless device configured for operation in a wireless communication network comprising two or more beam-based transmission points, wherein each of the two or more beam-based transmission points transmits synchronization signals corresponding to beams transmitted by the respective transmission point. The wireless device comprising a transceiver circuitry configured for communicating with the wireless communication network; and processing circuitry operatively associated with the transceiver circuitry and configured to receive information from the wireless communications network indicating a set of synchronization signals to use as synchronization sources; and maintain synchronization with the wireless communication network based on detecting any one or more of the synchronization signals in the set of synchronization signals.

Optionally, the processing circuitry is configured to maintain synchronization with the wireless communication network by using a strongest or highest-quality one of the synchronization signals as the synchronization source.

Optionally, the processing circuitry is configured to report a signal strength or other measurement for one or more synchronizations signals that are detected by the wireless device but not included in the set of synchronization signals.

An example embodiment provides a wireless device configured for operation in a wireless communication network comprising two or more beam-based transmission points, wherein each of the two or more beam-based transmission points transmits synchronization signals corresponding to beams transmitted by the respective transmission point. The wireless device comprises transceiver circuitry configured receive signals transmitted by transmission points; and processing circuitry operatively associated with the transceiver circuitry and configured to: identify a subset of radio resources to use when searching for synchronization signal transmissions from a neighboring transmission point, according to a known relationship to a subset of radio resources being used by a first transmission point for synchronization signal transmission; and search for synchronization signal transmissions in the identified subset of radio resources.

Optionally, the known relationship comprises a known offset in time and/or frequency, and wherein the processing circuitry is configured to identify the subset of radio resources by applying the known offset in time and/or frequency to a time and/or frequency associated with the subset of radio resources used by the first transmission point for synchronization signal transmission.

Optionally, the processing circuitry is configured to determine the known relationship based on preconfigured information stored in the wireless device or from signaling received from the wireless communication network.

Optionally, the processing circuitry is configured to identify the subset of radio resources within a configured bandwidth, as configured for the wireless device by the wireless communication network.

An example embodiment provides a network node adapted to perform the method of any example.

An example embodiment provides a beam-based transmission point adapted to perform the method of any example.

An example embodiment provides a wireless device adapted to perform the methods of any example.

An example embodiment provides a non-transitory computer readable storage medium storing a computer program comprising program instructions that, when executed on at least one processing circuit of a network node in a wireless communications network that includes two or more beam-based transmission points, where each of the two or more beam-based transmission points transmits synchronization signals corresponding to beams transmitted by the respective transmission point, causes the network node to: configure the two or more beam-based transmission points to use non-conflicting radio resources for their respective transmissions of synchronization signals.

An example embodiment provides a non-transitory computer readable storage medium storing a computer program comprising program instructions that, when executed on at least one processing circuit of a beam-based transmission point in a wireless communication network comprising two or more beam-based transmission points, causes the beam-based transmission point to select radio resources in dependence on an assigned identifier or other configured value; and transmit synchronization signals using the selected radio resources, the synchronization signals being transmitted in association with two or more beams transmitted by the transmission point.

An example embodiment provides a non-transitory computer readable storage medium storing a computer program comprising program instructions that, when executed on at least one processing circuit of a wireless device configured for operation in a wireless communication network comprising two or more beam-based transmission points, causes the wireless device to receive information from the wireless communications network indicating a set of synchronization signals to use as synchronization sources; and maintain synchronization with the wireless communication network based on detecting any one or more of the synchronization signals in the set of synchronization signals.

An example embodiment provides a non-transitory computer readable storage medium storing a computer program comprising program instructions that, when executed on at least one processing circuit of a wireless device configured for operation in a wireless communication network comprising two or more beam-based transmission points, causes the wireless device to identify a subset of radio resources to use when searching for synchronization signal transmissions from a neighboring transmission point, according to a known relationship to a subset of radio resources being used by a first transmission point for synchronization signal transmission; and search for synchronization signal transmissions in the identified subset of radio resources.

An example embodiment provides a computer program comprising program instructions which when executed on a network node causes the network node to perform the method according to any example.

An example embodiment provides a computer program, comprising program instructions which when executed on a beam-base transmission point causes the transmission point to perform the method according to any example.

An example embodiment provides a computer program, comprising program instructions which when executed on a wireless device causes the wireless device to perform the methods according to any example.

An example embodiment provides a carrier comprising the computer program according to any example, wherein the carrier is one of an electronic signal, an optical signal, a radio signal and a computer readable medium.

An example embodiment provides a network node in a wireless communications network with two or more beam-based transmission points, the network node comprising: a configuring module for configuring the two or more beam-based transmission points to use non-conflicting radio resources for their respective transmissions of synchronization signals.

An example embodiment provides a beam-based transmission point in a wireless communication network with two or more beam-based transmission points, the beam-based transmission point comprising a selecting module for selecting radio resources in dependence on an assigned identifier or other configured value; and a transmitting module for transmitting synchronization signals using the selected radio resources, the synchronization signals being transmitted in association with two or more beams transmitted by the transmission point.

An example embodiment provides a wireless device configured for operation in a wireless communication network comprising two or more beam-based transmission points, the wireless device comprising: a receiving module for receiving information from the wireless communications network indicating a set of synchronization signals to use as synchronization sources; and a maintaining module for maintaining synchronization with the wireless communication network based on detecting any one or more of the synchronization signals in the set of synchronization signals.

An example embodiment provides a wireless device configured for operation in a wireless communication network comprising two or more beam-based transmission points, the wireless device comprising: an identifying module for identifying a subset of radio resources to use when searching for synchronization signal transmissions from a neighboring transmission point, according to a known relationship to a subset of radio resources being used by a first transmission point for synchronization signal transmission; and a searching module for searching for synchronization signal transmissions in the identified subset of radio resources.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 11 illustrates a method of configuring transmission points by assigning identifiers to the transmission points, according to some embodiments.

FIG. 13 illustrates a method of transmitting a synchronization signal, according to some embodiments.

FIG. 15 illustrates a method of searching for synchronization signals, according to some embodiments.

DETAILED DESCRIPTION

As discussed above, a lack of proper PCI planning may also cause PCI confusion between a detected cell and a neighboring cell if the two cells have the same frequency and PCI, and if the reference signal received power (RSRP) of the two cells reaches the handover threshold. The PCI confusion may lead to UE handover failures or service drops.

One possible strategy for planning PCIs is to group neighboring sites into clusters, where each cluster is assigned a limited number of Code Groups. Each site is assigned a specific Code Group and each sector a specific Color Group. Another alternative could simply be a random planning, for example, a PCI plan that does not consider PCI grouping and does not follow any specific reuse pattern.

In the first strategy, PCIs can be split into three different color groups and 168 code groups. Code groups should be reserved for special purposes, e.g., in-building and public land mobile network (PLMN) borders or for future expansions. One can alternatively derive the PCIs as follows:

$$PCI_i = 3SSS_j + PSS_k$$

Figure 1:
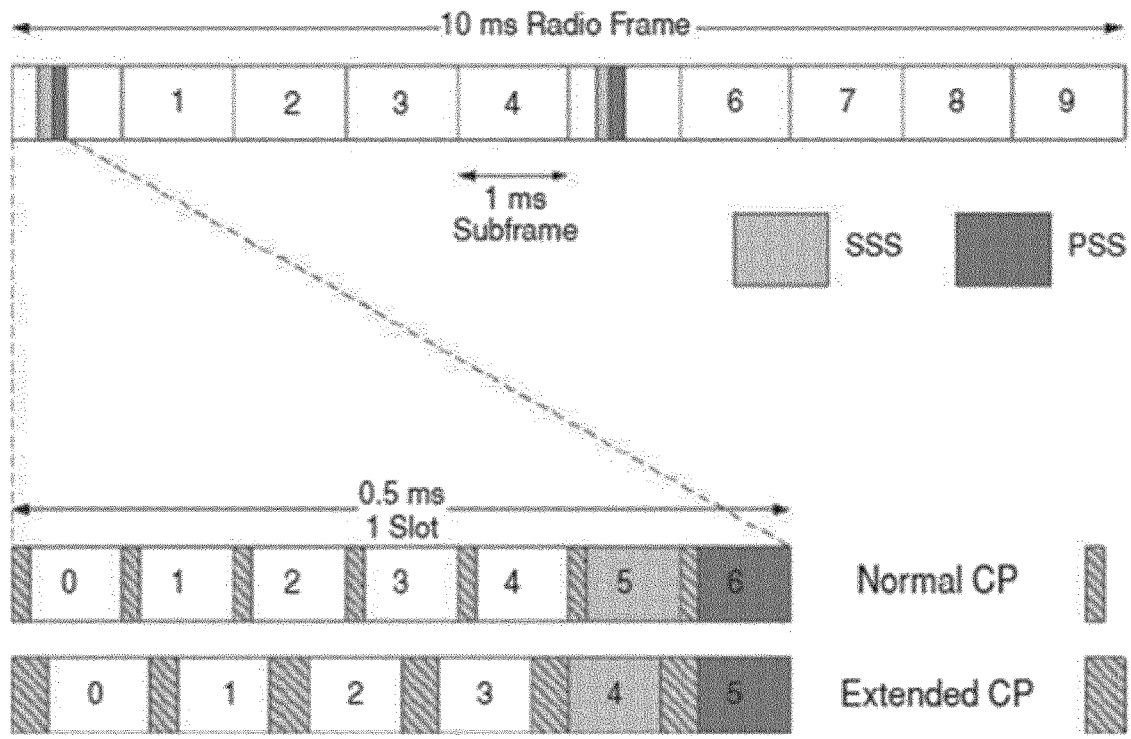
FIG. 1 is a diagram illustrating PSS and SSS frame and slot structure in time domain in the FDD case.
Figure 2:
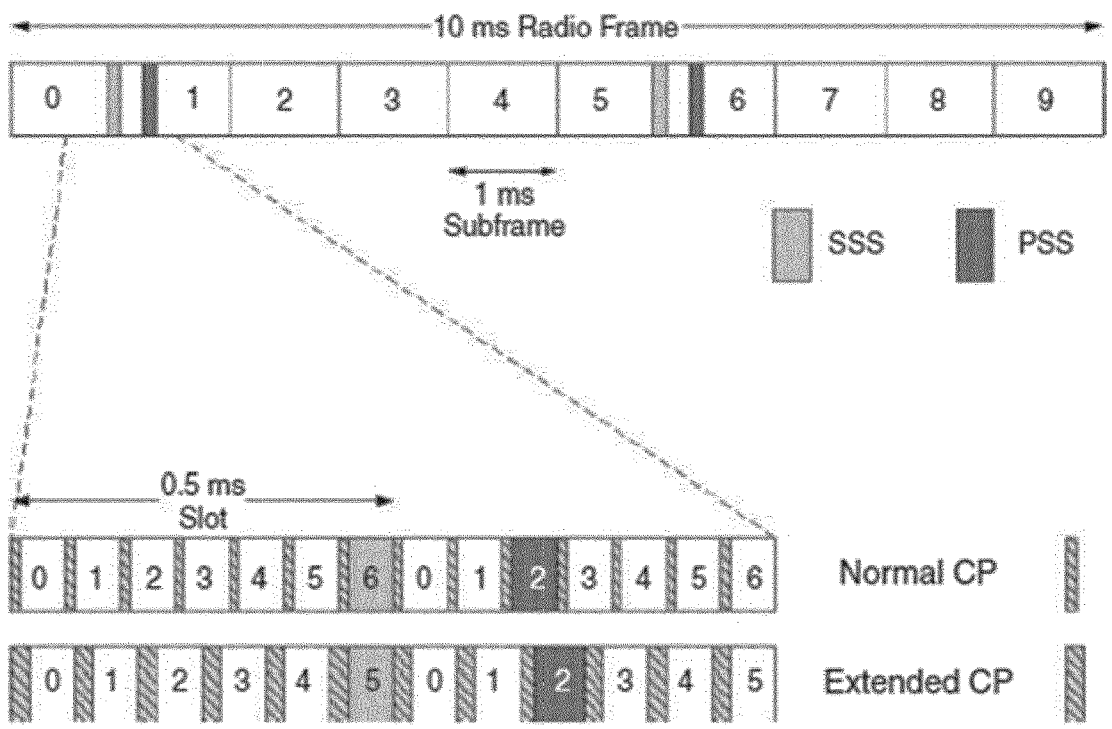
FIG. 2 is a diagram illustrating PSS and SSS frame and slot structure in time domain in the TDD case.
Figure 3:
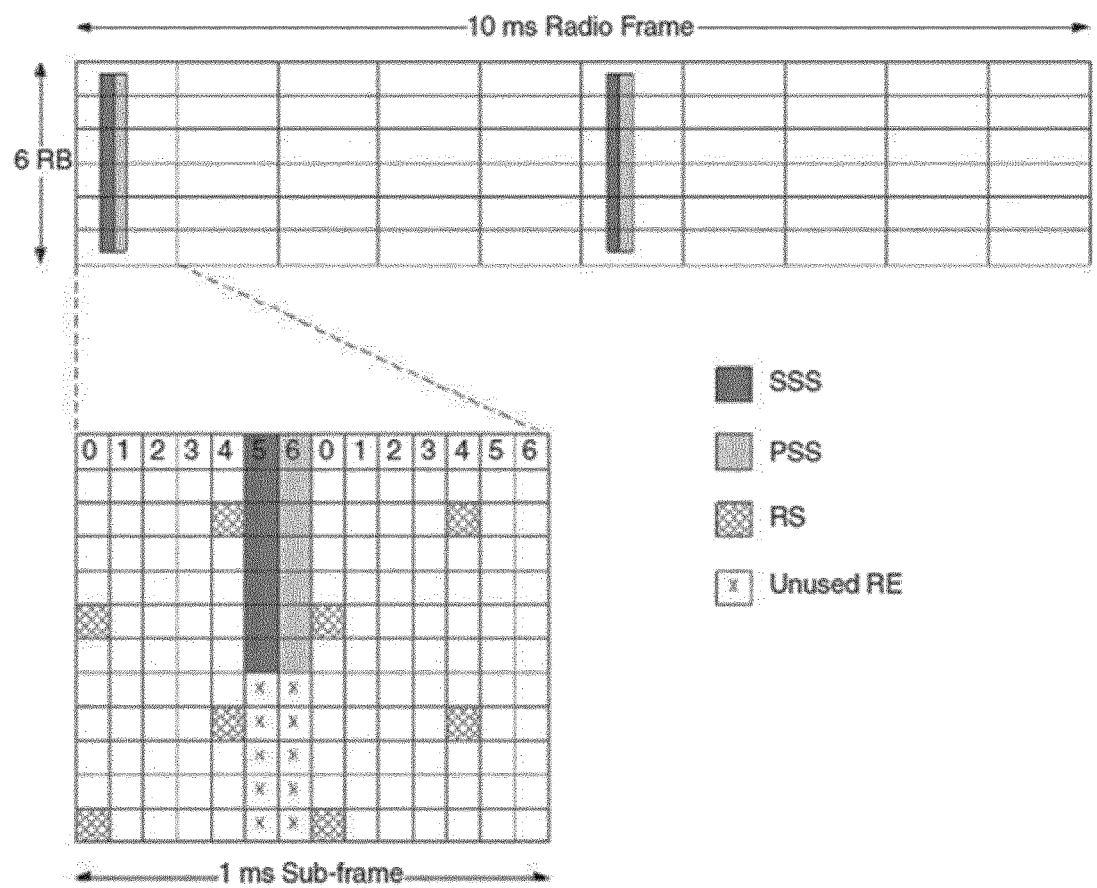
FIG. 3 is a diagram illustrating PSS and SSS frame structure in frequency and time domain for an FDD cell.
Figure 4:
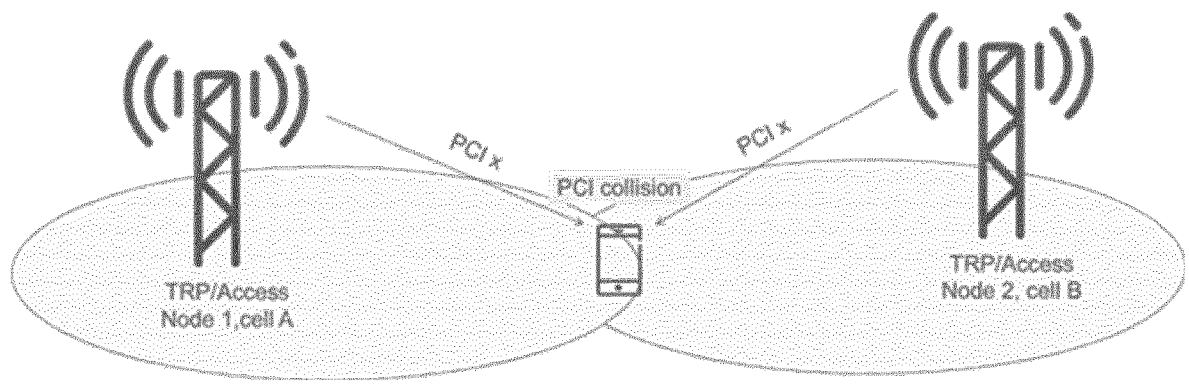
FIG. 4 is a diagram illustrating PCI collision.
Figures 5, 6:
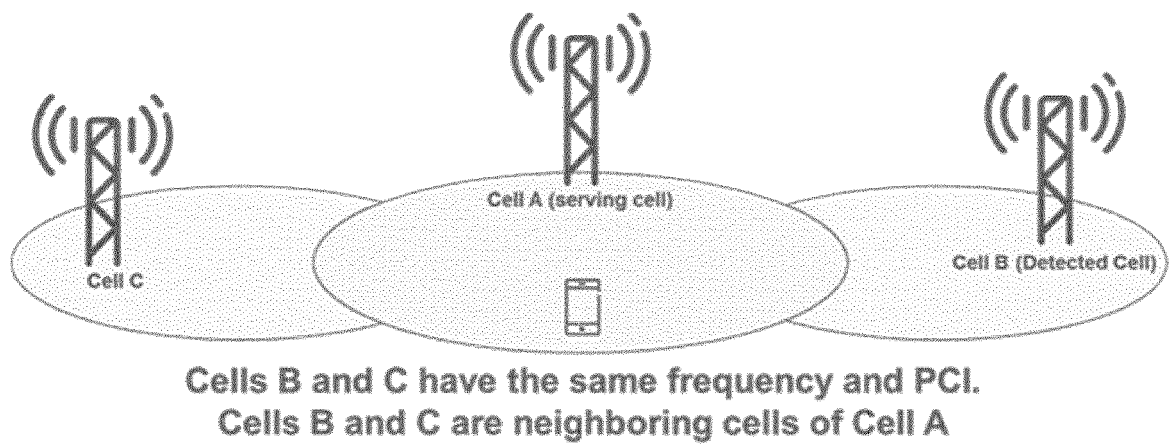
FIG. 5 is a diagram illustrating PCI confusion.
FIG. 6 is a table with the PCIs derived from PSSs/SSSs and their color code.
Figure 7:
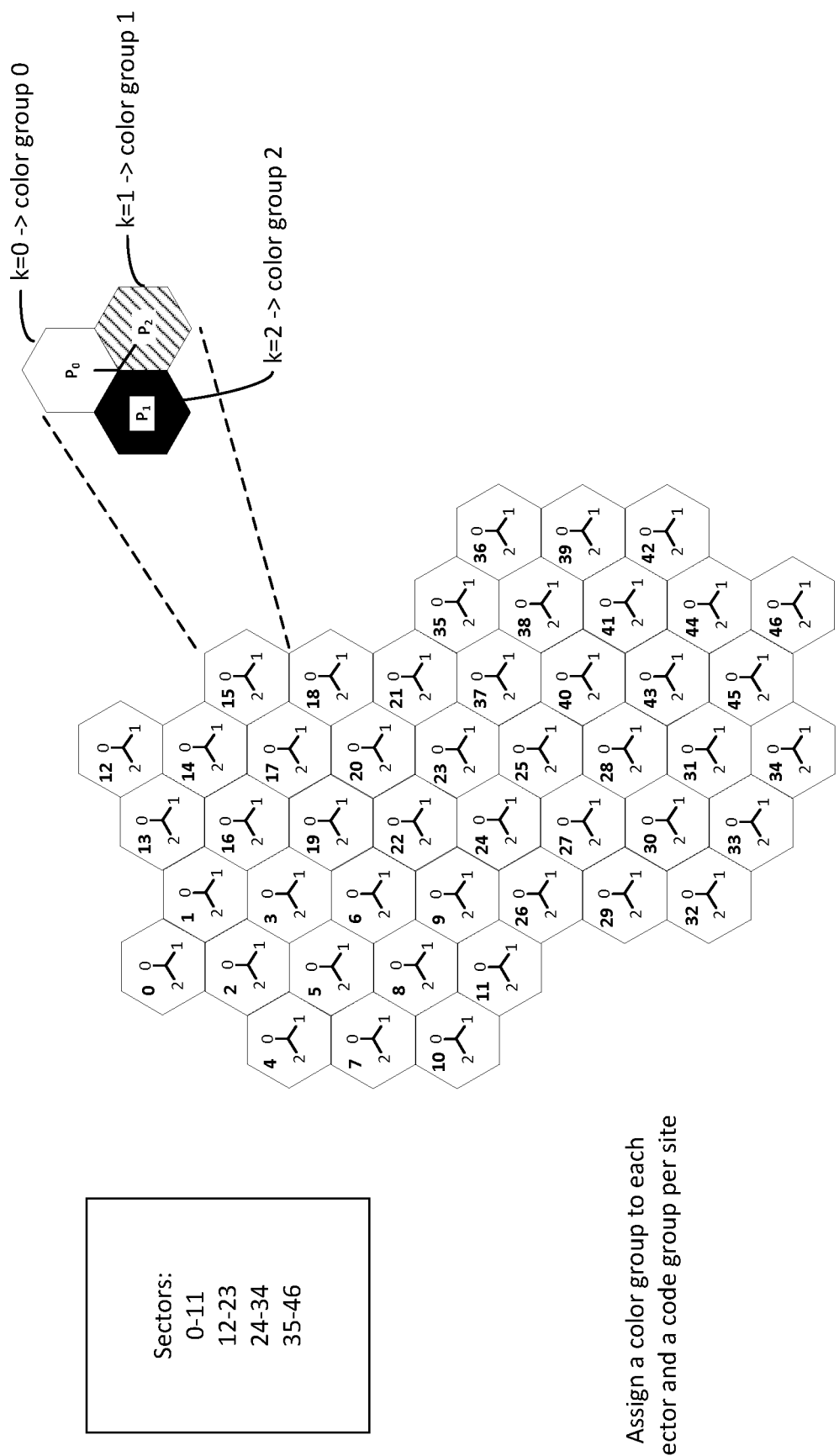
FIG. 7 is a diagram illustrating an example of a few clusters with their assigned PCI to avoid conflict and collisions.

FIG. 6 shows a table with the PCIs derived from PSSs/SSSs and their color code. If a color group is assigned per sector and a code group is assigned per site, this will eliminate the risk of having the same k or frequency shift in the same site, in adjacent cells or pointing at each other. In a given example, an allocation is shown with 10 to 15 sites with 3-sector sites in a cluster, as illustrated by FIG. 7, where each of these clusters is represented by a color. For each cluster, a subset of code groups is used. For example, if there are ~70 code groups available, PCIs may be repeated every fifth or sixth cluster. Structured planning like this eliminates the risk of having conflicting k or frequency shift in the same site, in adjacent cells or pointing at each other. Also, the risk of having conflicting SSS sequences in adjacent cells is reduced—although this may appear at cluster borders.

Despite the simplicity of this methodology, in practice, the coverage patterns are not regular in terms of inter-side distances and sector angles. For example, there could be deployments in the same area with 3-sector, 6-sector and Omni sites. Therefore, it may not be possible to follow a strict planning pattern so priority orders would need to be followed.

One possible priority order when planning PCIs is the following: (1) The same PCIs should be avoided within the same site and as neighbors; (2) PCIs with conflicting k values should be avoided within the same site and as neighbors; and (3) PCIs with conflicting m0 and m1 values should be avoided within the same site and as neighbors, where m0 and m1 are parameters derived from the SSS.

There could be exceptions for not following these rules strictly, such as in cases where they may not work in an irregular pattern or in cases where it will cause a lot of limitations on neighbors so that neighbor lists have to be shortened.

There is a common understanding that "New Radio" (NR) will consider frequency ranges up to 100 GHz. In comparison to the current frequency bands allocated to LTE, some of the new bands will have much more challenging propagation properties, such as lower diffraction and higher outdoor/indoor penetration losses. As a consequence, signals will have less ability to propagate around corners and penetrate walls. In addition, in high frequency bands, atmospheric/rain attenuation and higher body losses render the coverage of NR signals even spottier. Operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will massively rely on beamforming to provide coverage. NR networks are, thus, examples of beam-based wireless communication networks.

Figure 8:
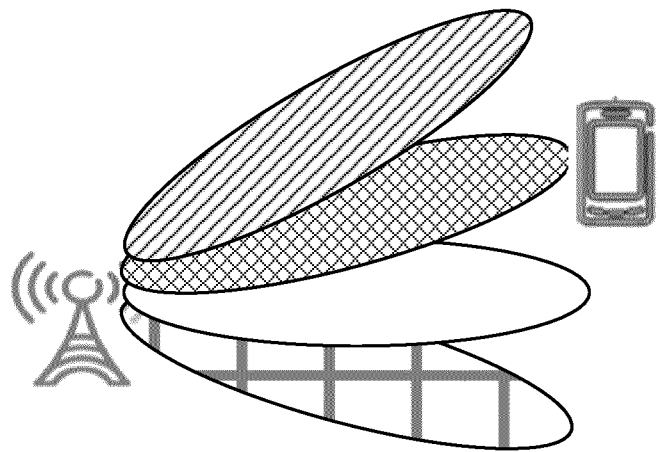
FIG. 8 is a diagram illustrating a beam sweeping procedure.

In addition, different antenna architectures should be supported: analog, hybrid and digital. This implies some limitations in terms of how many directions can be covered simultaneously, especially in the case of analog/hybrid beamforming. In order to find a good beam direction at a given Transmission Point (TP, also referred to as a Transmission Reception Point or TRP), access node or antenna array, a beam-sweep procedure is typically employed. A typical example of a beam-sweep procedure involves the node pointing a beam containing a synchronization signal and/or a beam identification signal, in each possible direction, one or a few directions at a time. This is illustrated in FIG. 8.

In LTE, a UE in Connected mode obtains its source synchronization from the PSS/SSS, which derives the PCI. The UE is said to be connected to a Cell in RRC Connected state. In some cases of NR, the notion of a Cell is not needed for Connected mode UEs.

In order to resolve the synchronization problem in a beam-based system with the lack of the definition of an NR cell for Connected mode UEs, it is recognized herein that multiple sets of synchronization sequences may be used as a synchronization source. This may include using multiple sets of Mobility Reference Signals (MRSs). A transmission point transmits one or multiple sets of synchronization sequences to be used autonomously by UEs as their synchronization source for time and frequency synchronization in the downlink, to keep a UE synchronized when it moves across the coverage of these different sets of sequences being transmitted by the same access node or TP.

Figure 9:
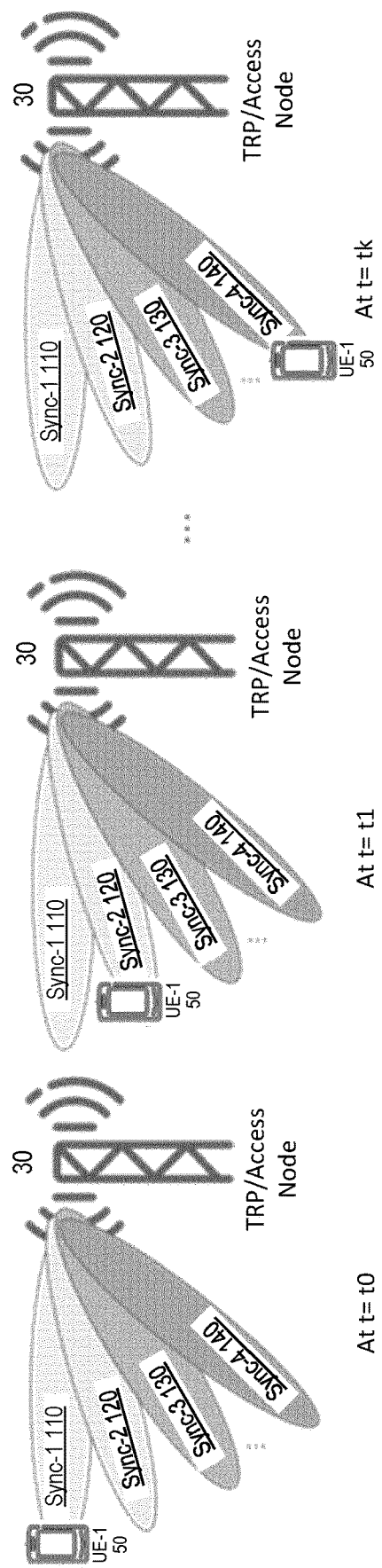
FIG. 9 is a diagram illustrating a UE that considers itself synchronized with the source in different times.

In the context of further details recognized herein, FIG. 9 is a diagram illustrating a wireless device 50 that considers itself synchronized with the source at different times (t0, t1 and tk) using different sets of sequences 110, 120, 130 and 140. These multiple set of sequences 110-140 can be beamformed in different directions by a transmission point (TRP)/access node 30. These set of sequences, for example in the case of analog/hybrid beamforming, can rely on a beam sweeping procedure in order to be possibly detected by UEs in multiple directions. In the example of FIG. 9, the wireless device 50 determines that it will use a first synchronization sequence 110 at time t0. The wireless device 50 later determines that it will use a second synchronization sequence 120 at time t1 and a third synchronization sequence 140 at time tk.

If these sequences are to be used for that purpose (e.g., MRSs designed like the PSSs/SSSs in LTE), a sequence planning like the PCI planning in LTE would need to be defined. However, the problem in NR, especially in the higher frequency deployments, is more challenging because some nodes may need to define very narrow beams to transmit multiple MRSs. This would be equivalent to defining a much higher number of cell sectors in LTE per node/site, which would make the MRS planning a much more difficult task.

In at least some embodiments, a wireless communication network includes certain network nodes, i.e., transmission points, that use antenna beamforming. Rather than operating with a conventional "cell" concept, wireless devices may be served via one or more beams associated with a serving node or nodes. A wireless device may be configured to consider a particular set of beams as its serving set and it may be served via any one or more of such beams and it may maintain synchronization with the network via synchronization signals transmitted in association with any of the beams, i.e., as part of the beams transmitted by the transmission points for the serving node or nodes.

In more detail, each transmission point may transmit a set of synchronization signals, e.g., a different synchronization sequence for each transmitted beam, such that the wireless device can distinguish between the synchronization signals received for each beam. According to the teachings herein, the network is configured such that the transmission points select the radio resources used for transmission of synchronization signals in a manner that avoids or at least minimizes synchronization signal collisions between neighboring nodes, and avoids or minimizes instances of synchronization signal confusion. As an example, the transmission points select the time and/or frequency resources used for synchronization signal transmission according to a configuration or methodology that results in neighboring nodes selecting non-conflicting radio resources, for example, selecting non-conflicting time/frequency resources to use for their respective synchronization signal transmissions, to avoid synchronization signal collisions and/or confusion.

With the above in mind, in one or more embodiments, an advantageous method of network planning includes configuring transmission points in a wireless communication network by assigning identifiers, which may be explicit ID numbers or some other distinguishing values, to the transmission points according to an assignment scheme that avoids using the same value for geographically neighboring transmission points, at least within a given coverage area of the wireless communication network. Correspondingly, each transmission point transmits a number of synchronization signals using radio resources selected as a function of its assigned value. Transmission points having different assigned values choose different radio resources for transmission of their respective synchronization signals.

In one or more such embodiments, the synchronization signals transmitted by each transmission point serve as reference signals enabling a receiving wireless device to perform synchronization measurements and/or to perform Radio Resource Management (RRM) measurements for the respective beams, such as estimating received-signal strength or received-signal quality.

Taking the example case where the particular radio resources used by a given transmission point (TP) for synchronization-signal transmission depends on the value of the identifier assigned to the TP, the contemplated method may include configuring the TP to select the particular time and/or frequency resources used by the TP for transmission of the synchronization signals, in dependence on a configured value. For example, the TP selects Physical Resource Blocks (PRBs) in a time/frequency grid to use for synchronization signal transmission, in dependence on the configured value. For example, the configured value maps to an index, offset, or absolute resource position, based on a mapping relationship known to the TP.

The method may also include configuring each TP to adapt one or more beamforming parameters, including at least one beam sweeping parameter, in dependence on the configured value, such that the at least one beam sweeping parameter is adapted differently by any given two transmission points that have different configured values, e.g., different assigned identifiers.

In further example details, the TPs may be configured to select the particular times and/or the particular frequencies to use for transmitting their respective synchronization signals, in dependence on their respective configured values, such that neighboring TPs transmit their respective synchronization signals at different times and/or at different frequencies. Correspondingly, assigning the values to the respective TPs comprises assigning values from a defined set of values, each such value being associated with time and/or frequency selections for the transmission of synchronization signals. Such processing, e.g., in the context of an automated network planning process, includes controlling the assignment of the values to the TPs so as to avoid having neighboring TPs using the same time and/or frequency selections for the transmission of their respective synchronization signals.

In one or more embodiments, the network planning and associated TP configurations are such that neighboring TPs transmit their respective synchronization signals in adjacent times and/or in adjacent frequencies. Adjacent transmissions like this are useful in that they allow a wireless device to use a simple offset relationship when attempting to detect synchronization signals from a neighboring TP. The use of adjacent resources in such a manner may be particularly preferred for TPs that are tightly synchronized. For TPs that are not synchronized, or at least not tightly synchronized, it may be preferable to increase the "distance" (in time and/or frequency) between the resources used by one TP for synchronization-signal transmissions versus the resources used by a neighboring TP for synchronization-signal transmissions.

Thus, in some embodiments, for synchronized TPs, the method includes configuring neighboring TPs so as to minimize the distance between the radio resources used by neighboring TPs for synchronization signal transmission, while for unsynchronized transmission points, the method includes configuring the neighboring TPs so as to maximize the distance between radio resources used them.

With the above examples in mind, one or more embodiments disclosed herein involve configuring two or more beam-based TPs in a wireless communication network to use non-conflicting radio resources for their respective transmissions of synchronization signals. This may include assigning identifiers to TPs according to an assignment scheme that avoids using a same identifier for geographically neighboring TPs, at least within a given coverage area of the wireless communication network. This process may include allocating a single identifier (ID) per node from which the node can derive the time, frequency or time/frequency resource elements to transmit synchronization signals, such as for a beam sweeping procedure. Such a technique allows each node to select a subset of synchronization signals to be transmitted. The synchronization signals can be transmitted either on demand or periodically without necessarily coordinating which synchronization signals are being used with neighbor nodes, since the synchronization signals can be self-detectable by the wireless devices or UEs.

In an example, each node/TP/Cell is associated to an identifier (e.g. access node ID, eNB ID, gNB, cell ID, etc.) that is used to select the time-frequency-code resources used for synchronization-signal transmission and, optionally, beam sweeping parameters. Multiple sets of synchronization signal sequences, e.g., multiple MRSs, transmitted by the same node are associated to the same ID. Other beam sweeping configurations can also be adapted based on the ID, such as the order in which to use adjacent MRSs in adjacent subframes/OFDM symbols.

Figure 10:
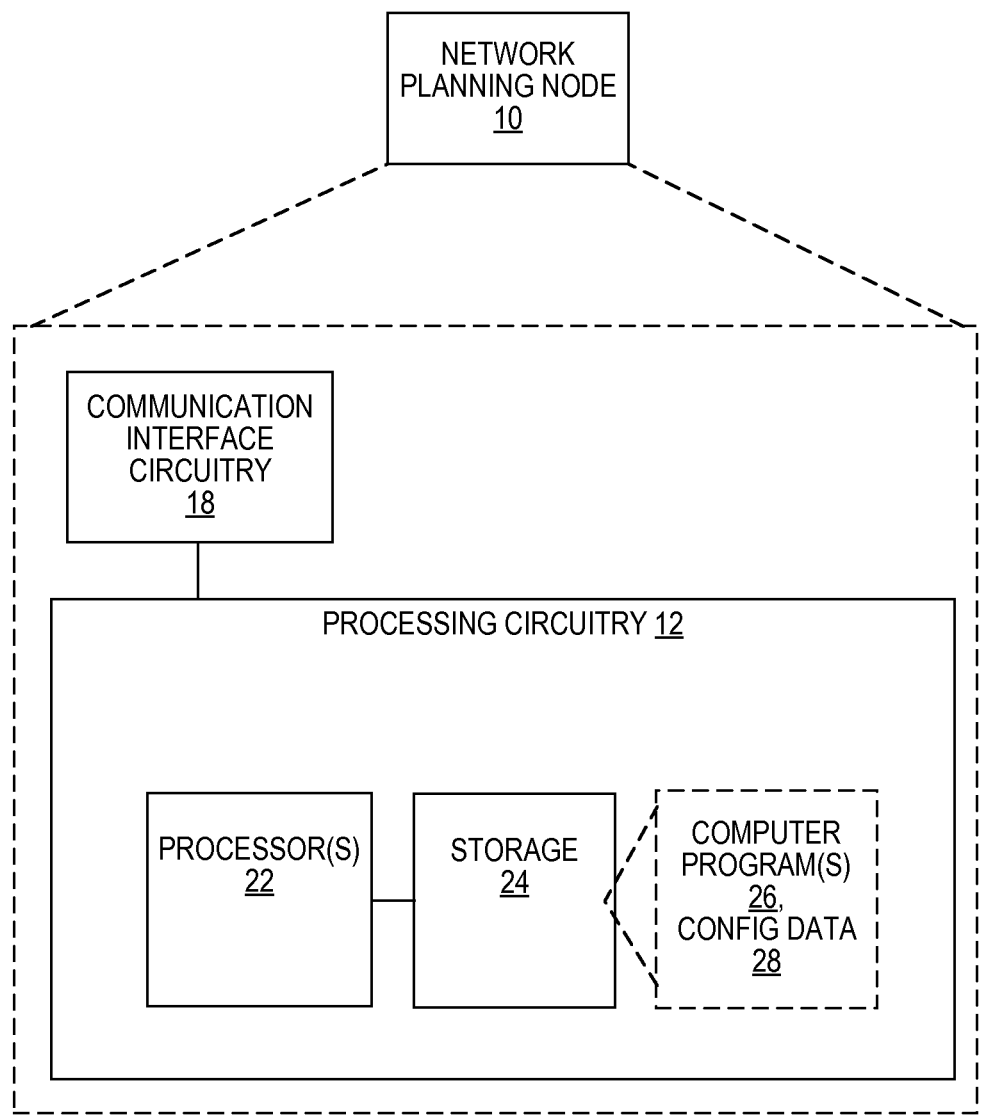
FIG. 10 is a block diagram of a network planning node, according to some embodiments.

FIG. 10 illustrates a network planning node 10, e.g., an appropriately configured computer system, such as a server. The network planning node 10 includes communication interface circuitry 18 that includes circuitry for communicating with receiving input data, e.g., network information regarding TP sites, etc., and for outputting data, e.g., assignments of identifiers or other configured values.

The network planning node 10 further includes processing circuitry 12 that is operatively associated with the communication interface circuitry 18. In an example embodiment, the processing circuitry 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 12 may comprise fixed circuitry, or programmable circuitry that is specially configured via the execution of program instructions implementing the functionality taught herein.

The processing circuitry 12 also includes or is associated with storage 24. The storage 24, in some embodiments, stores one or more computer programs 26 and, optionally, configuration data 28 (e.g., a configured value to control synch-signal resource selection). The storage 24 provides non-transitory storage for the computer program 26 and it may comprise one or more types of computer-readable media, such as disk storage, solid-state memory storage, or any mix thereof. By way of non-limiting example, the storage 24 comprises any one or more of SRAM, DRAM, EEPROM, and FLASH memory.

In general, the storage 24 comprises one or more types of computer-readable storage media providing non-transitory storage of the computer program 26 and any configuration data 28 used by the network planning node 10. Here, "non-transitory" means permanent, semi-permanent, or at least temporarily persistent storage and encompasses both long-term storage in non-volatile memory and storage in working memory, e.g., for program execution.

In some embodiments, the processor 22 of the processing circuitry 12 may execute a computer program 26 stored in the storage 24 that configures the processor 22 to perform network planning as disclosed herein. In one embodiment, the network planning node 10 configures transmission points, or outputs configuration information for such configuration, such that neighboring transmission points in the network use non-conflicting resources when transmitting their respective synchronization signals.

The processing circuitry 12 of the network planning node 10 implements a planning and configuration method, such as the method 1100 of FIG. 11. The method 1100 includes configuring the two or more beam-based transmission points to use non-conflicting radio resources for their respective transmissions of synchronization signals (Block 1102). The transmission points may be configured to select synchronization signal transmission resources according to patterns or offsets that avoid synchronization signal collisions and confusion. Radio resources may be selected in dependence on a value of an identifier, where the configuring includes assigning identifiers or other configured values to the transmission points.

In some cases, the assigning includes assigning different identifiers according to an assignment scheme that avoids using a same value for geographically neighboring transmission points at least within a given coverage area of the wireless communication network (Block 1112). The configuring then includes configuring (Block 1114) each transmission point to select the particular radio resources used for transmission of the synchronization signals as a function of the respective assigned identifier, such that transmission points having different assigned identifiers choose different radio resources for synchronization signal transmission.

Figure 12:
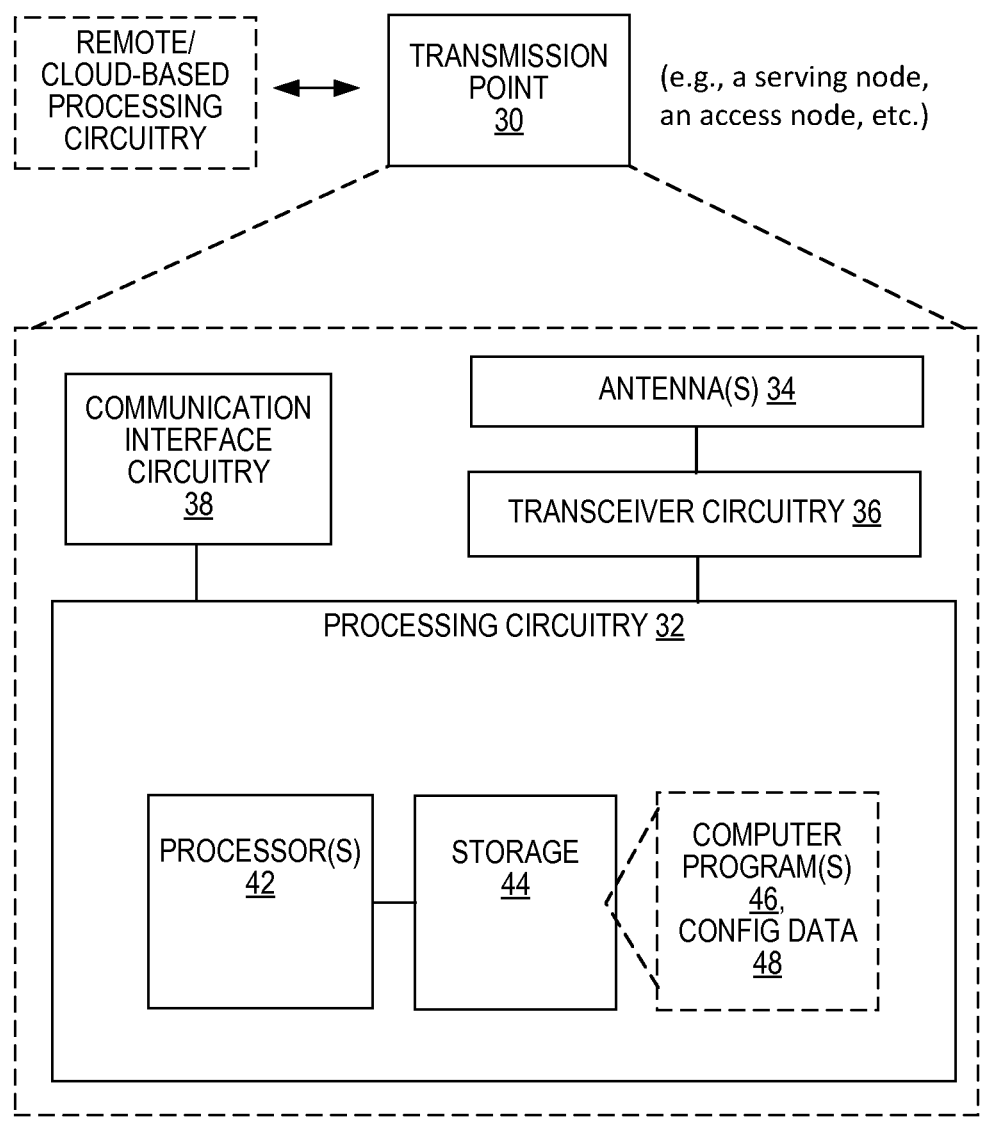
FIG. 12 is a block diagram of a transmission point, according to some embodiments.

FIG. 12 illustrates an example transmission point 30, which may generally referred to as a network node, and which may be known as or may comprise a part of a gNB, and eNodeB, a serving node, etc. The transmission point 30 includes communication interface circuitry 38 for communicating with other nodes of the same type or of varying types. For example, the transmission point 30 may cooperate with a remote or cloud-based processing element that performs at least some of the processing described herein on the network side.

The transmission point 30 communicates with wireless devices operating in the network via antennas 34 and a transceiver circuitry 36. The transceiver circuitry 36 may include transmitter circuits, receiver circuits, and associated control circuits that are collectively configured to transmit and receive signals according to one or more radio access technology, for communicatively coupling wireless devices to the network.

In one or more embodiments, the processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein, or may comprise some mix of fixed and programmed circuitry The processing circuitry 32 also includes or is associated with storage 44. The storage 44, in some embodiments, stores one or more computer programs 46 and, optionally, configuration data 48. The storage 44 provides non-transitory storage for the computer program 46 and it may comprise one or more types of computer-readable media, such as disk storage, solid-state memory storage, or any mix thereof. By way of non-limiting example, the storage 44 comprises any one or more of SRAM, DRAM, EEPROM, and FLASH memory.

In general, the storage 44 comprises one or more types of computer-readable storage media providing non-transitory storage of the computer program 46 and any configuration data 48 used by the transmission point 30. Here, "non-transitory" means permanent, semi-permanent, or at least temporarily persistent storage and encompasses both long-term storage in non-volatile memory and storage in working memory, e.g., for program execution.

In some embodiments, the processor 42 of the processing circuitry 32 may execute a computer program 46 stored in the storage 44 that configures the transmission point 30 to perform antenna beamforming according to a configured set of beams and transmit a synchronization signal in each beam. The synchronization signal transmitted in each beam is based on a different synchronization sequence selected from a set of synchronization sequences configured for use by the transmission point 30. Each synchronization signal serves as a signal synchronization and/or measurement source for wireless devices operating within a coverage area of the beam. The processing circuitry 32 is also configured to select radio resources to use for transmitting the synchronization signals as a function of an identifier assigned to the transmission point and transmit the synchronization signals using the selected radio resources, the synchronization signals being transmitted in association with two or more beams transmitted by the transmission point.

FIG. 13 illustrates a method 1300, such as is implemented by the transmission point 30, or by some other appropriately configured transmission point. The method 1300 includes selecting radio resources in dependence on an assigned identifier or other configured value (Block 1302) and transmitting synchronization signals using the selected radio resources (Block 1304). The synchronization signals are transmitted in association with two or more beams transmitted by the transmission point.

Additionally, or alternatively, transmission points may communicate with each other to determine, e.g., non-conflicting time/frequencies to use for their respective synchronization signal transmissions, to avoid synchronization signal collisions and confusion.

In further example details, the transmission point beamforms transmissions according to a configured set of beams and transmits a synchronization signal for each beam. The synchronization signal enables a receiving wireless device to perform synchronization measurements and/or received-signal strength or quality measurements. Transmitting a synchronization signal for each beam may include, for example, basing each synchronization signal based on a different synchronization sequence selected from a set of synchronization sequences. The transmission point may be configured with one or more such sets, and each synchronization signal serves as a signal synchronization and/or measurement source for wireless devices operating within a coverage area of a corresponding beam.

The method may also include the transmission point beamforming transmissions according to a configured set of beams and performing beamforming transmissions of the synchronization signals according to a particular beam sweeping pattern or timing, and selecting or configuring the particular beam sweeping pattern or timing in dependence on or as a function of the assigned identifier or other configured value.

The transmission point may use a radio frame structure, where each radio frame comprises a number of physical resource blocks (PRBs) defined according to a time/frequency grid. Correspondingly, the method may include selecting the radio resources to use for sync-signal transmission by choosing the PRBs to use for transmission of the synchronization signals.

In the same or another embodiment, the transmission point derives at least one of a time shift and/or a frequency shift as a function of the assigned identifier or other configured value, wherein the time shift and/or frequency shift control the particular radio resources selected by the transmission point for transmission of the synchronization signals.

The synchronization signals may include Mobility Reference Signals (MRSs), for example, where each MRS comprises a Time Synchronization Signal (TSS) and a Beam Reference Signal (BRS). Each BRS uniquely identifies one of the beams in a configured set of beams used by the transmission point.

Figure 14:
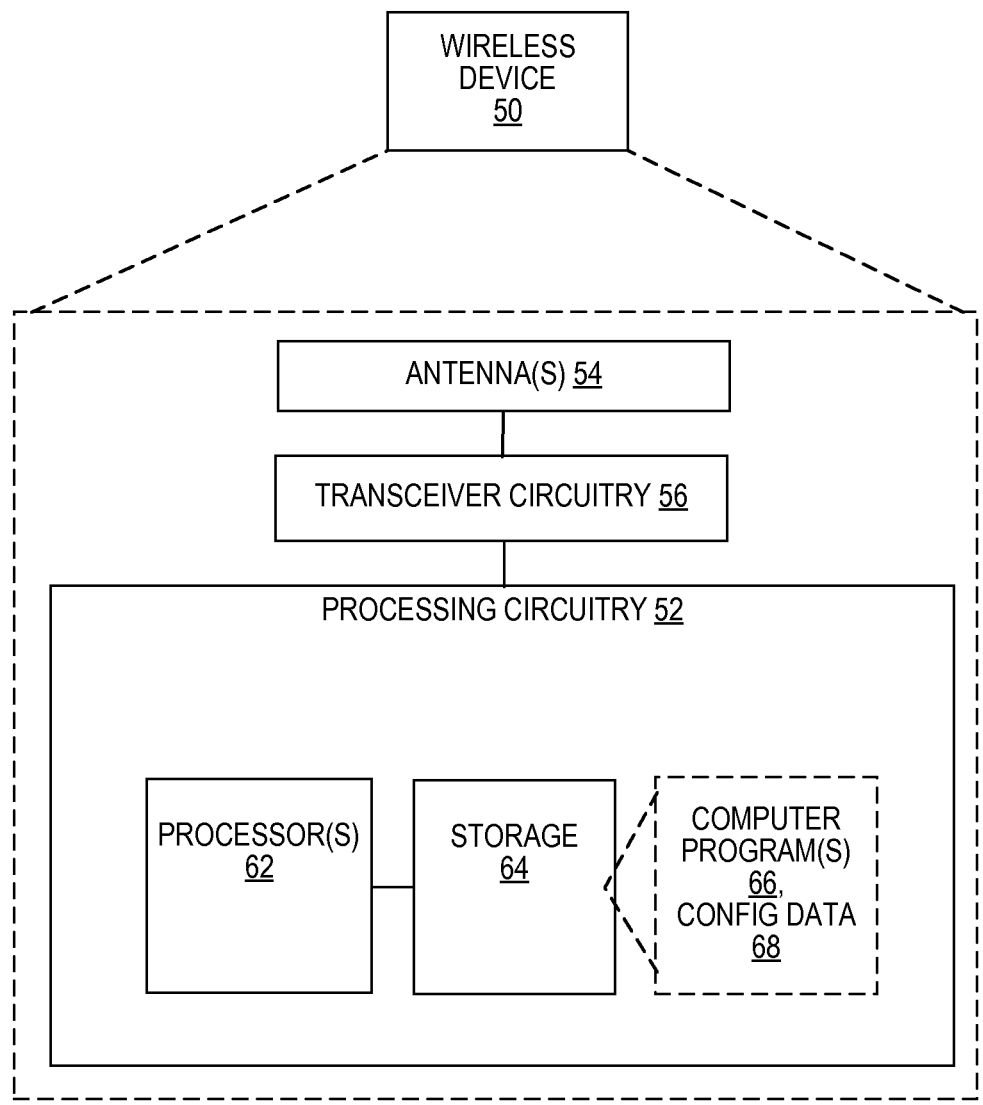
FIG. 14 is a block diagram of a wireless device, according to some embodiments.

FIG. 14 illustrates an example wireless device 50, which may be a User Equipment or UE within the meaning of 3GPP parlance. In general, the wireless device 50 comprises essentially any type of communication device or apparatus configured for operation in a wireless network of the type(s) contemplated herein. Non-limiting examples include mobile terminals, such as tablets, laptops, cellular radiotelephones (including smartphones and/or feature phones), network adaptors, modems, or dongles, etc. It should be appreciated that a wireless device 50 may provide an operator interface and may support voice, data, and multimedia, or it may be a Machine Type Communication (MTC) device intended for Machine-to-Machine (M2M) usage.

The wireless device 50 includes or is associated with one or more antennas 54, and includes transceiver circuitry 56 and associated processing circuitry 52. The transceiver circuitry 56 is configured to transmitting signals to a wireless communication network and for receiving signals from the network, e.g., to/from one or more transmission points providing a radio interface to the network.

The processing circuitry 52 in an example embodiment comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry.

For example, in one or more embodiments, the processing circuitry 52 comprises one or more processing circuits 62 that include or are associated with storage 64. In some embodiments, the storage 64 stores one or more computer programs 66 and, optionally, configuration data 68. The storage 64 provides non-transitory storage for the computer program 66 and it may comprise one or more types of computer-readable media, such as disk storage, solid-state memory storage, or any mix thereof. By way of non-limiting example, the storage 64 comprises any one or more of SRAM, DRAM, EEPROM, and FLASH memory. In general, the storage 64 comprises one or more types of computer-readable storage media providing non-transitory storage of the computer program 66 and any configuration data 68 used by the wireless device 50.

In some embodiments, the processor 62 of the processing circuitry 52 may execute a computer program 66 stored in the memory 64 that configures the wireless device to identify a subset of radio resources to use when searching for synchronization signal transmissions from a neighboring transmission point, according to a known relationship to a subset of radio resources determined by the wireless device as being used by a first transmission point for synchronization signal transmission. The processing circuitry 52 is further configured to search for synchronization signal transmissions in the identified subset of radio resources, where each transmission point transmits a set of synchronization signals corresponding to a set of configured beams used by the transmission point for beamforming transmissions.

Figure 22:
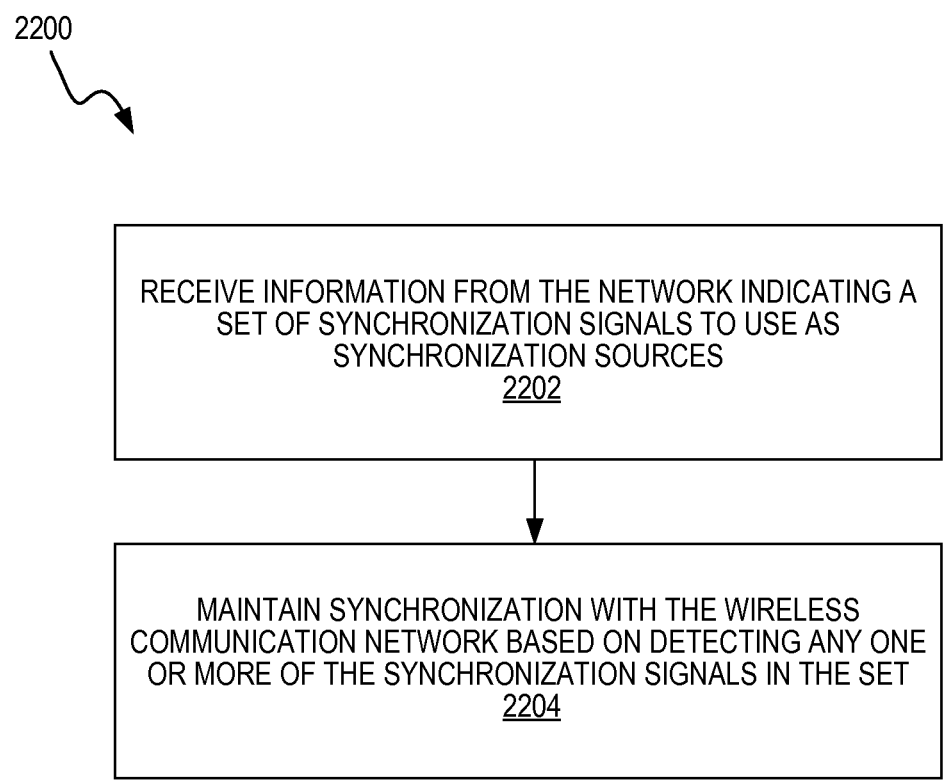
FIG. 22 illustrates a method of receiving information indicating a set of synchronization signals to use as synchronization sources, according to some embodiments.

In at least one embodiment, the wireless device 50, or another appropriately configured wireless device, is configured for operation in a wireless communication network comprising a plurality of transmission points, and is further configured to implement a method 2200, shown in FIG. 22, that includes receiving information from the network indicating a set of synchronization signals to use as synchronization sources (Block 2202), and maintaining synchronization with the wireless communication network based on detecting any one or more of the synchronization signals in the set (Block 2204).

As an example, maintaining synchronization with the wireless communication network comprises the wireless device using a strongest or highest-quality one of the synchronization signals as the synchronization source. The method 2200 may further include the wireless device reporting a signal strength or other measurement for one or more synchronizations signals that are detected by the wireless device but not included in the set. The network may use such reporting to reconfigure the beams included in the "serving set" of beams associated with the wireless device.

FIG. 15 illustrates a method 1500, which may be a further method implemented by a wireless device, or may be part of the immediately foregoing method. The method 1500 includes identifying a subset of radio resources to use when searching for synchronization signal transmissions from a neighboring transmission point, according to a known relationship to a subset of radio resources being used by a first transmission point for synchronization signal transmission (Block 1502). The method 1500 further includes searching (Block 1504) for synchronization signal transmissions in the identified subset of radio resources. Here, each transmission point transmits a number of synchronization signals corresponding to beams transmitted by the transmission point.

In a further example detail, the known relationship comprises a known offset in time and/or frequency. Thus, identifying the subset of radio resources comprises the wireless device applying the known offset in time or frequency to a time and/or frequency associated with the subset of radio resources used by the first transmission point for synchronization signal transmission. The wireless device determines the known relationship based on preconfigured information stored in the wireless device, or determines the known relationship from signaling received from the wireless communication network.

The wireless device may receive further information from the network aiding its search for synchronization signals. For example, in one embodiment, the wireless device identifies the subset of radio resources within a configured bandwidth, as configured for the wireless device by the wireless communication network.

Figure 16:
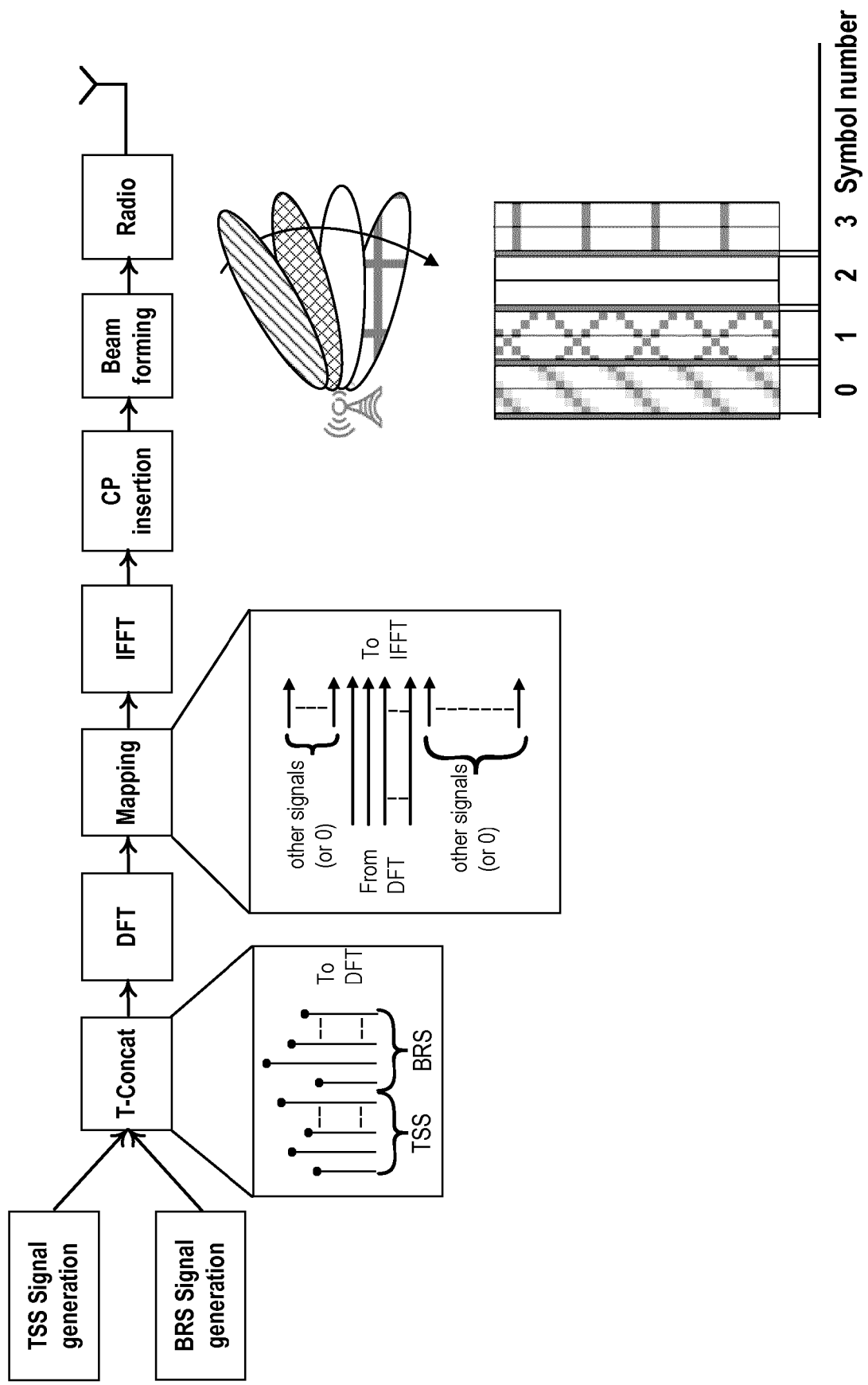
FIG. 16 is a diagram illustrating generation of a single MRS.
Figure 17:
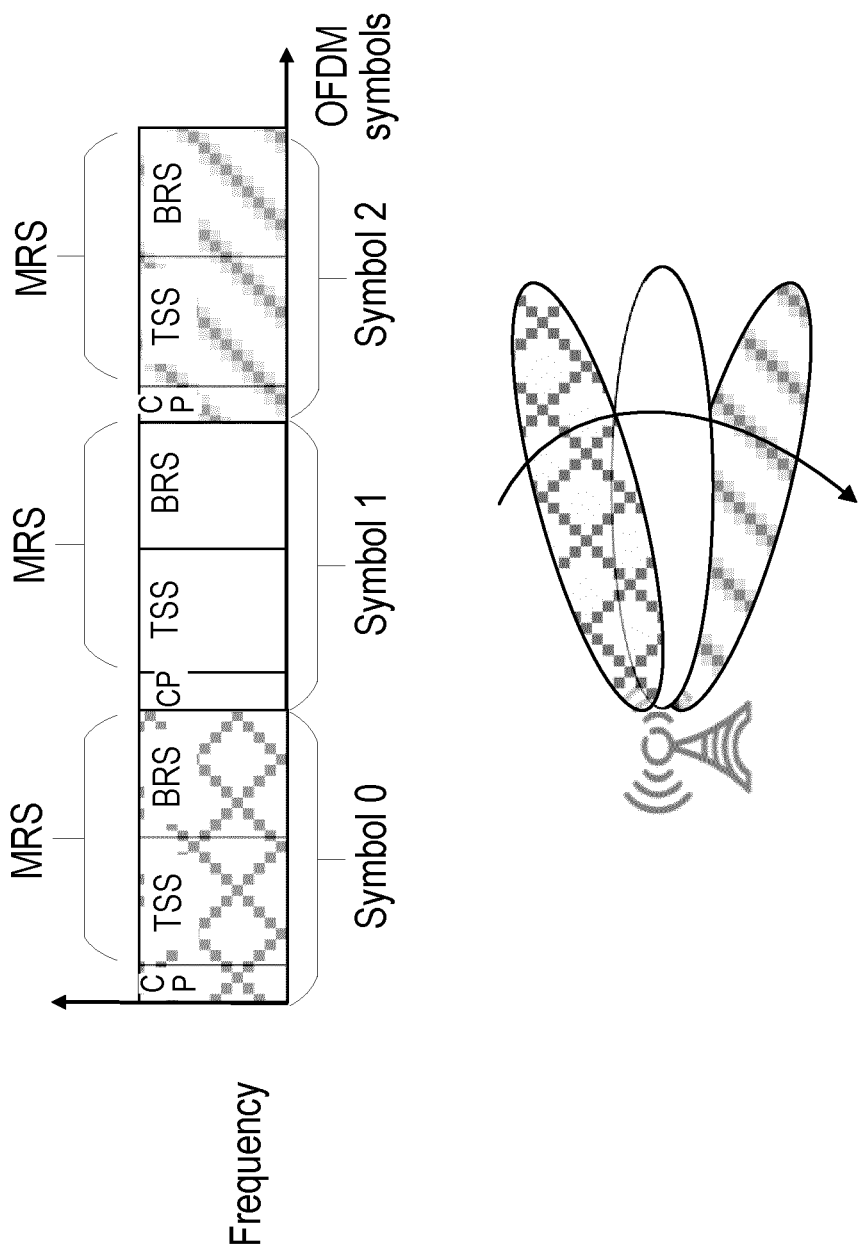
FIG. 17 is a diagram illustrating an MRS design in time and frequency domains.

As mentioned above, a synchronization signal (or a set of synchronization signals) may include an MRS. An MRS is constructed by concatenating a time and frequency synchronization signal (TSS) and a beam reference signal (BRS) in time into one OFDM symbol, as illustrated in FIG. 16. This construction can be done as a DFT precoded OFDM symbol with cyclic prefix. With both TSS and BRS in the same OFDM symbol, the transmitter is able to change its beamforming between each OFDM symbol. Compared to having separate OFDM symbols for TSS and BRS, the time required for scanning a set of beam directions is now halved. Both TSS and BRS will thus have shorter time durations as compared with separate OFDM symbols for each of them. Another way to represent the MRSs is shown in FIG. 17.

Figure 18:
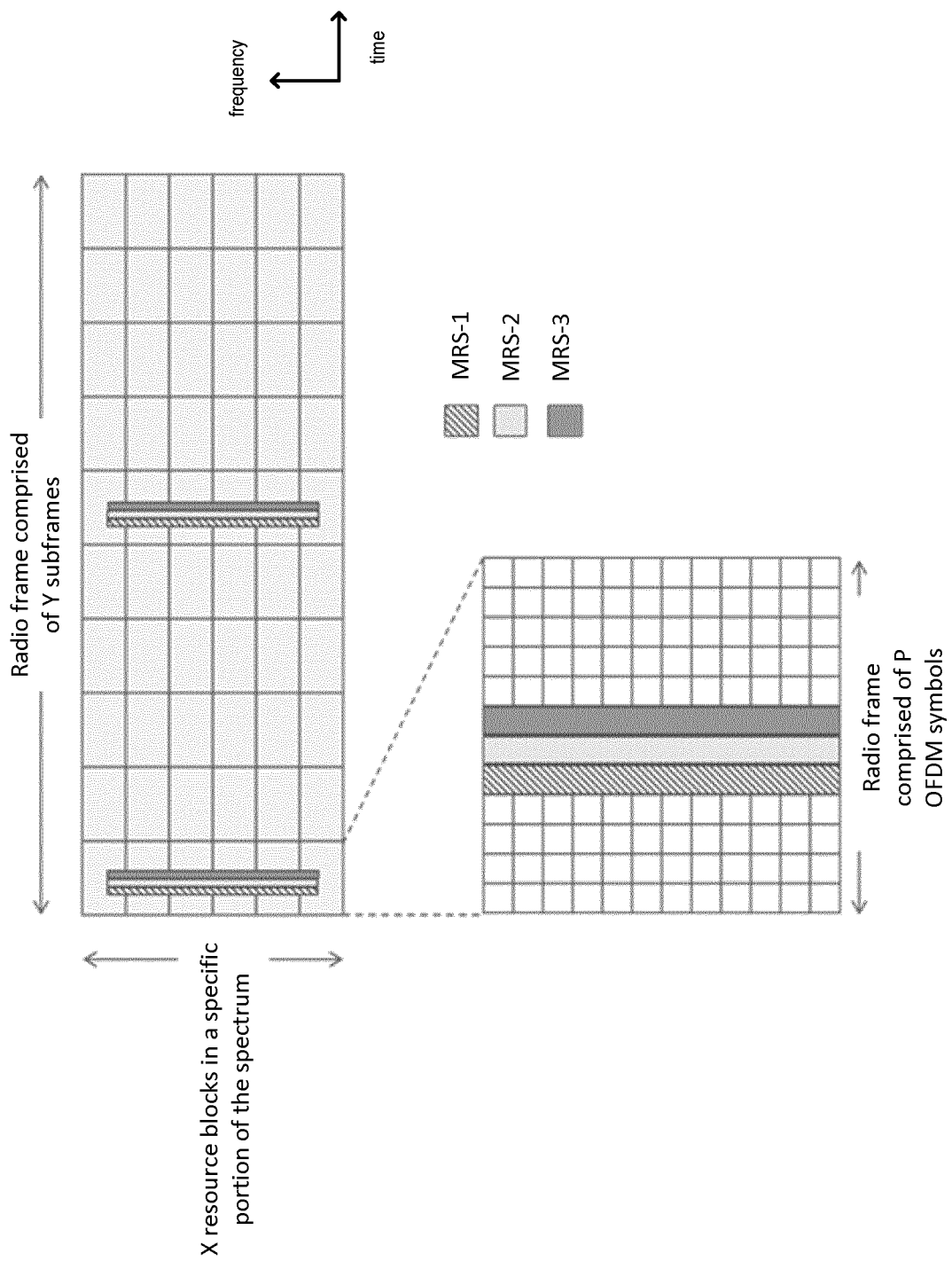
FIG. 18 is a diagram illustrating a set of MRSs allocated to a single node, according to some embodiments.

A single access node scenario is shown as a reference case. A multiple set of MRSs is allocated for a given transmission point. In this simplified reference case, for each subframe where MRSs are transmitted, each MRS is transmitted once per OFDM symbol, as shown in FIG. 18.

In this reference case, an arbitrarily chosen radio frame comprises subframes, as in LTE, where each subframe is comprised of two time-slots where each slot has 6 OFD symbols for a given cyclic prefix configuration. In this example, three MRSs are allocated to this node and these MRSs are transmitted in the symbols 5, 6 and 7 in subframes #0 and #5.

Every single node can use any MRS out of a pool or set of MRSs without notifying neighbors. These MRSs can either be transmitted periodically or aperiodic (on demand).

According to some embodiments, a multi-node case with a frequency shift derived from node ID includes the use of an allocated node identifier in order to scramble the frequency block (e.g. a subset of the downlink PRBs) used to transmit the MRSs. A certain number of possible frequency blocks per frequency band can be pre-defined in the standards for each possible bandwidth in NR. As it can be shown in the example of FIG. 19, three transmission points are allocated three node IDs where each of the IDs are associated to a specific subset of PRBs to be used, so that if neighbor transmission points having these identities decide to use MRSs and end up using the same or correlated MRSs, collision and confusion can possibly be avoided.

Figure 20:
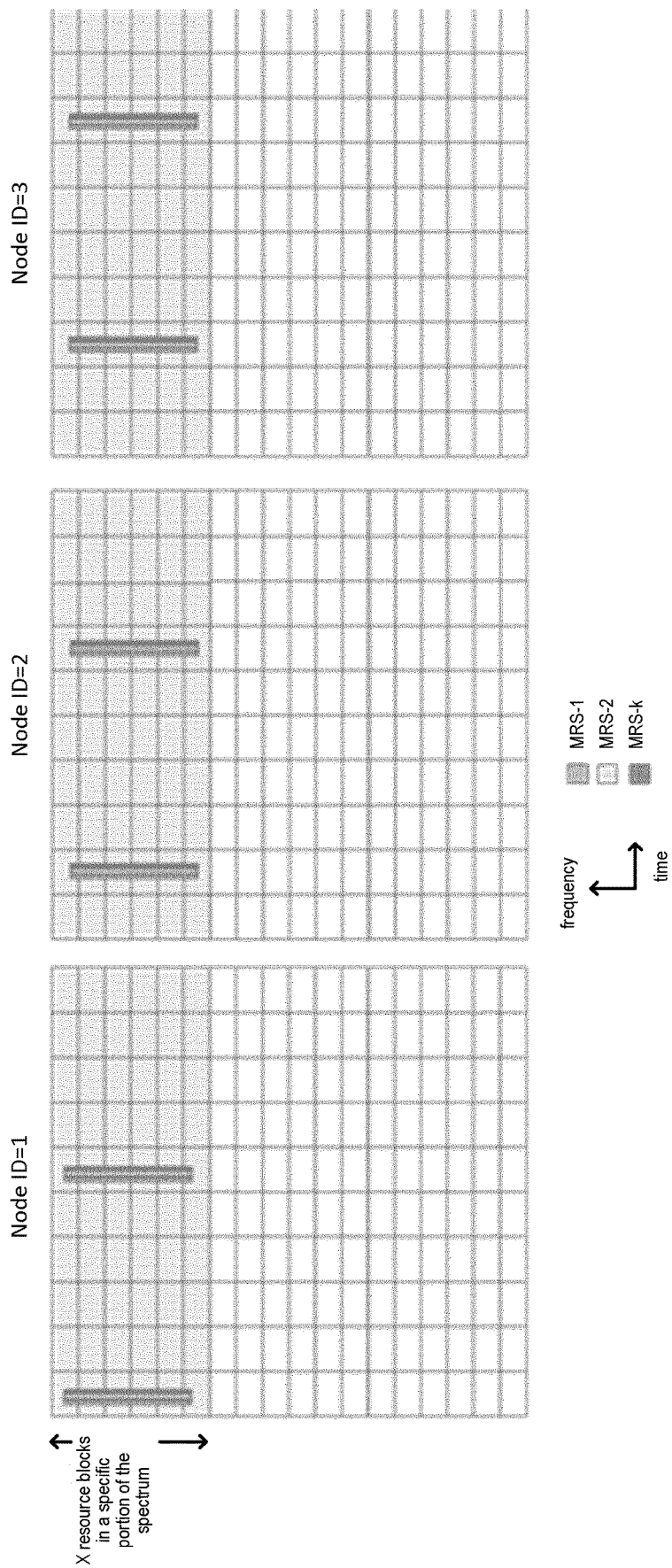
FIG. 20 is a diagram illustrating a subframe used to transmit MRSs derived from a Node ID, according to some embodiments.

Notice that in this solution the time-domain allocation remains the same. In one alternative, the pattern indicated by the node ID associated to adjacent frequency blocks can be allocated to neighbor transmission points, as shown in FIG. 20. This can be attractive especially when transmission points are synchronized. In a second alternative, the pattern indicated by the node ID associated to frequency blocks that are in extreme parts of the band can be allocated to neighbor transmission points to reduce the collision probability even further. That can be attractive in the case of non-synchronized transmission points. FIG. 20 shows the frequency block used to transmit MRSs derived from the node ID.

Figure 21:
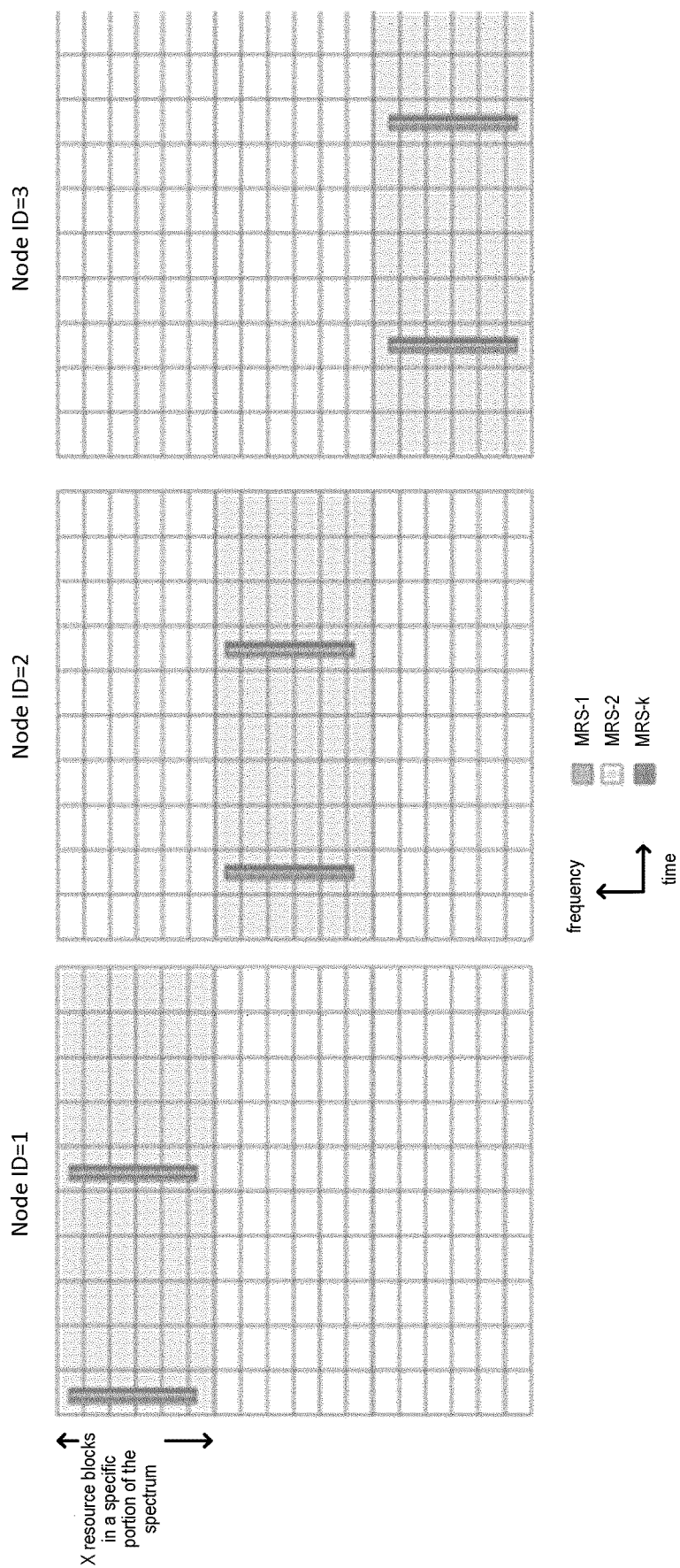
FIG. 21 is a diagram illustrating both the time and frequency allocation for transmitting MRSs, according to some embodiments.

A multi-transmission-point case with a time resource (e.g. subframe) derived from a node ID will be described. Various embodiments involve the usage of an allocated node identifier, such as a transmission point ID, in order to scramble the time-domain resources to transmit the MRSs. The resources may include a specific subframe within the radio frame and/or the OFDM symbol used to transmit the first MRS in a given sweep period. In the previous example, the sweep period was a single subframe. FIG. 21 shows a subframe used to transmit MRSs derived from the node ID. Notice that beam sweep occurs in subframes #0, #1 or #2 depending on the node ID.

Figure 19:
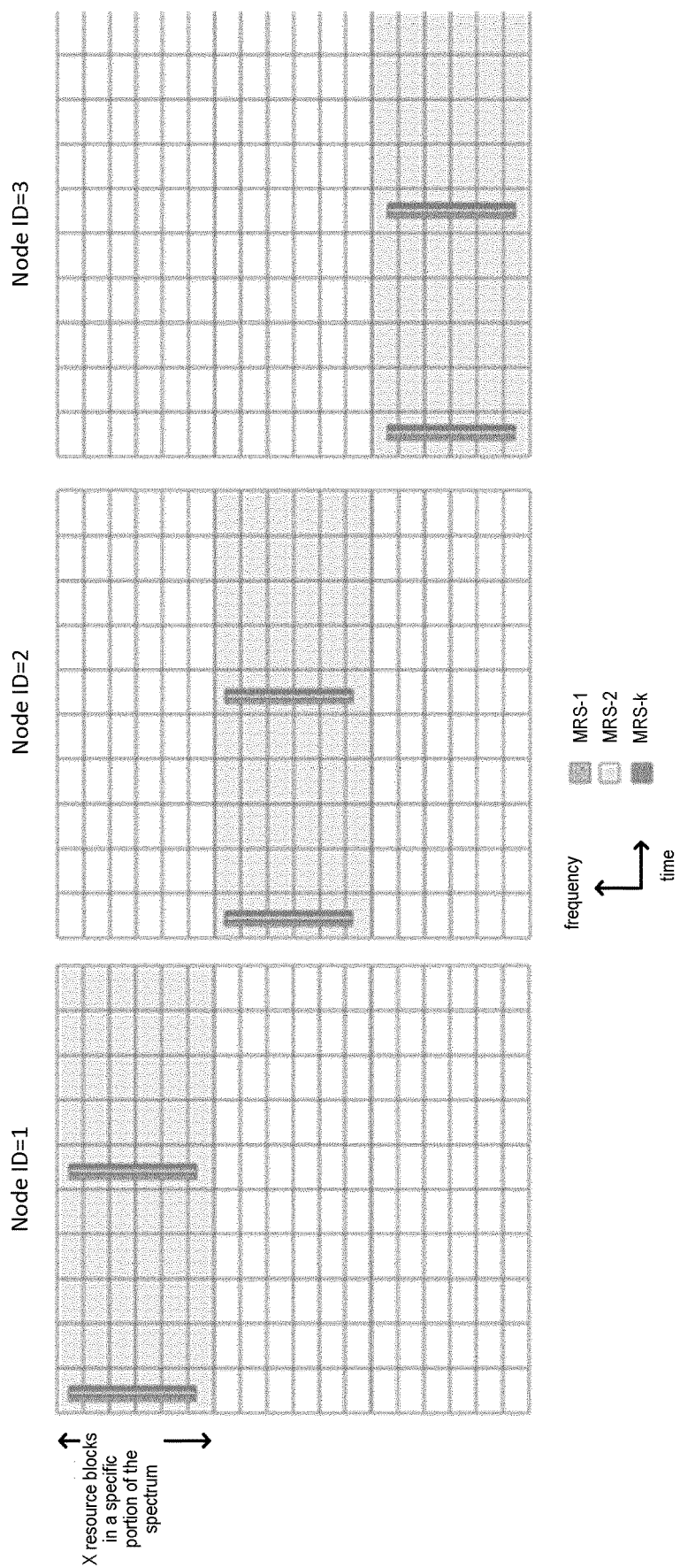
FIG. 19 is a diagram illustrating a frequency block used to transmit MRSs derived from a Node ID, according to some embodiments.

As it can be shown in the example of FIG. 19, three transmission points are allocated three node IDs where each of the IDs are associated to a specific subframe to be used so that if neighbor transmission points having these identities decide to use MRSs and end up using the same or correlated MRSs, collision and confusion can possibly be avoided. In one alternative example, node IDs are allocated so that adjacent time slots are used by neighbor transmission points. This adjacent time allocation of MRSs is suitable for synchronized access nodes using a similar beam sweep configuration either in terms of number of MRS samples (including repetition) or sweep periodicity. In a second alternative, time slots far apart from each other are used to avoid the collision probability, which might be suitable in the case of unsynchronized transmission points.

While the examples show three MRSs transmitted per transmission point, any different number of MRSs can be transmitted by the different transmission points, if necessary. This means that, in some cases, some transmission points may be known to allocate a high number of MRSs, which means that more OFDM symbols per subframes are used for a beam sweep for synchronization. If it is known that some transmission points are typically using particular MRSs, some node ID and mapping allocations may allow some transmission points to use them. This is also applicable for cases where it seems that the network relies on the repetition of MRSs in the same beam.

For these cases where neighbor transmission points need to define different beam sweeping configurations (e.g., different number of MRSs, different repetition pattern, different beam sweeping period, etc.), the network can even allocate pairs of Node IDs per transmission points that need to use too many MRSs or rely a lot on repetition, if the time domain allocation per ID is used.

In another multi-transmission-point example, where the time and frequency allocation is derived from a node ID, an allocated node identifier (e.g., PCI) may be used to scramble both time and frequency resources to transmit MRSs for a given transmission point. FIG. 21 shows both the time and frequency allocation to transmit MRSs. For example, a subframe and frequency chunk is derived from the Node ID. Notice that a beam sweep occurs in subframes #0, #1 or #2 depending on the Node ID, in addition to the frequency allocation changed per Node ID. This would allow a higher usage of MRSs, such as when many MRSs need to be swept and may expand more than a time slot or subframe. It might also be interesting in cases where, in order to reach proper coverage, the same MRS might be repeated in consecutive OFDM symbols, which may easily occupy the full subframe.

Another embodiment may involve an additional measurement bandwidth range configuration from the network side. In this case, the operator allocates the node ID in accordance with a set of requirements that reduces the collision probability of the MRSs. However, there can be scenarios where there are multiple transmission points in the neighborhood and allocating node IDs in a clever way to reduce collision probability might become very problematic. In such a scenario, two neighbor transmission points could have distantly separated (in frequency) MRS allocations and there might be other neighbor transmission points with which the allocation of the MRSs in time-frequency grid is optimized.

In such a scenario, a wireless device, such as wireless device 50, could be aided for the search area of the MRSs in the neighborhood by the source node (e.g., transmission point 30) via the configuration of the bandwidth that the wireless device needs to monitor for MRSs from source and neighboring transmission points. The wireless device may further enhance the search area within this allocated bandwidth based on the implementation optimizations described earlier.

This configuration will also be beneficial when the neighboring transmission points' node IDs are allocated based on some other requirement than that of the collision avoidance and search area optimization of MRSs.

Advantages of these embodiments include the ability to avoid the planning of multiple MRSs per transmission point in a fixed manner, provide much higher flexibility to the transmission points and reduce the amount of network planning necessary to deploy a beam-based system.

While various techniques have been discussed with respect to the assignment of identifiers to the transmission points to avoid using the same identifier in a geographical area, the techniques may be used to more generally allocate time and/or frequency resources per transmission point, for the purpose of avoiding MRS, measurement and synchronization signal collisions.

In some embodiments, collisions of synchronization signals used for synchronization source acquisition and/or reference signals for RRM measurements may be avoided by transmitting these MRSs in different time and/or frequency resources for neighbors. In some cases, some ID planning may be used where the ID matches the resources and neighbor IDs.

Figure 23:
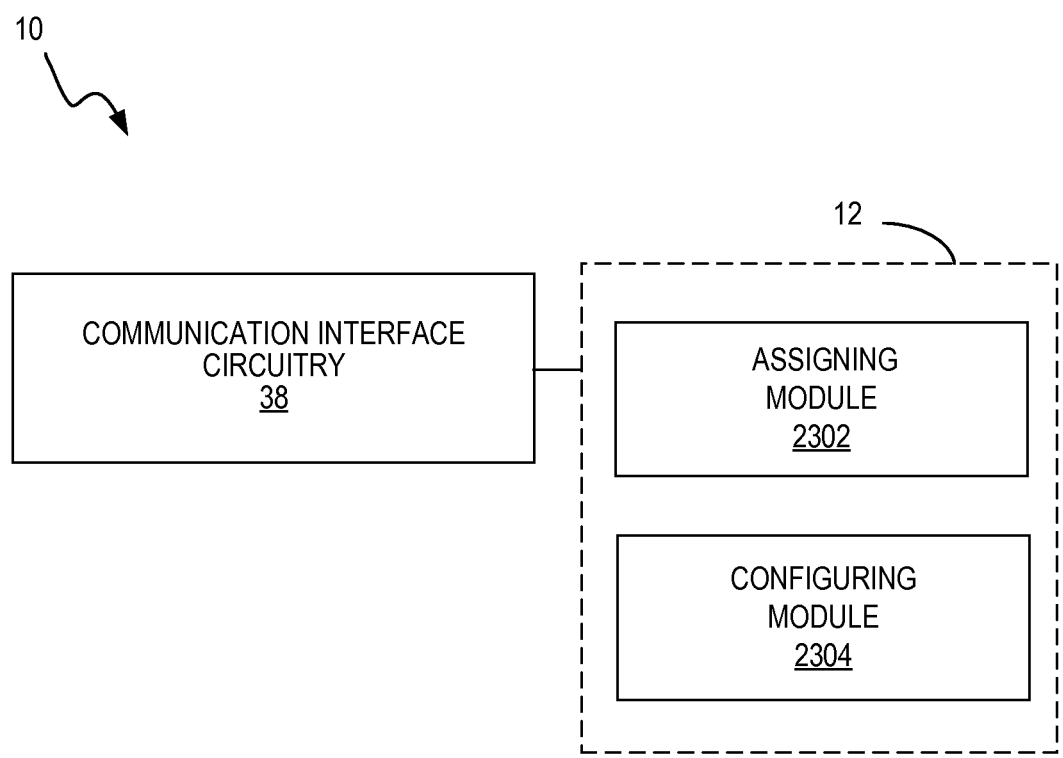
FIG. 23 is a block diagram illustrating a functional implementation of a network planning node, according to some embodiments.

FIG. 23 illustrates an example functional module or circuit architecture as may be implemented in a network planning node 10. The illustrated embodiment at least functionally includes a configuring module 2304 for configuring two or more beam-based transmission points to use non-conflicting radio resources for their respective transmissions of synchronization signals. The implementation also includes an assigning module 2302 for assigning identifiers to the transmission points according to an assignment scheme that results in neighboring transmission points selecting the resources to use for their respective transmission of beam-specific synchronization signal in a manner that avoids or minimizes synchronization signal collisions and synchronization signal confusion. The configuring module 2304 then configures the transmission points according to the determined assignments, either by communicating directly with the transmission points, or by providing assignment information to one or more other nodes, e.g., Operation & Maintenance (O&M) nodes in a core network, that are responsible for configuring the transmission points.

Figure 24:
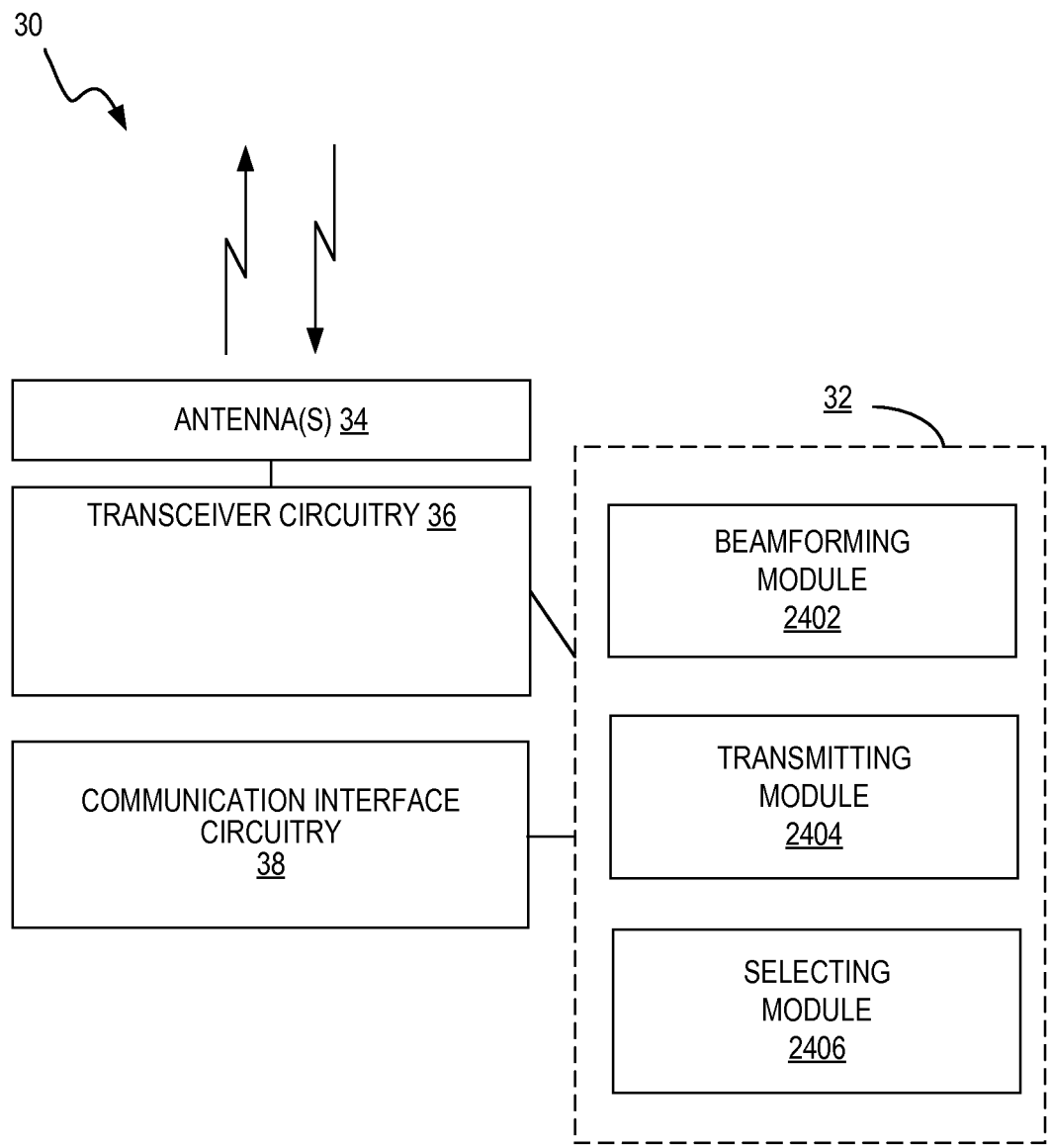
FIG. 24 is a block diagram illustrating a functional implementation of a beam-based transmission point, according to some embodiments.

FIG. 24 illustrates an example functional module or circuit architecture as may be implemented in a transmission point 30. The transmission point 30 includes a beamforming module 2402 for beamforming transmissions according to a configured set of beams. The transmission point 30 also includes a transmitting module 2404 for transmitting a synchronization signal for each beam, where the synchronization signal transmitted for each beam is based on a different synchronization sequence selected from a set of synchronization sequences configured. The implementation further includes a selecting module 2406 for selecting the radio resources to use for transmitting the synchronization signals, e.g., based on an identifier or other value.

Figure 25:
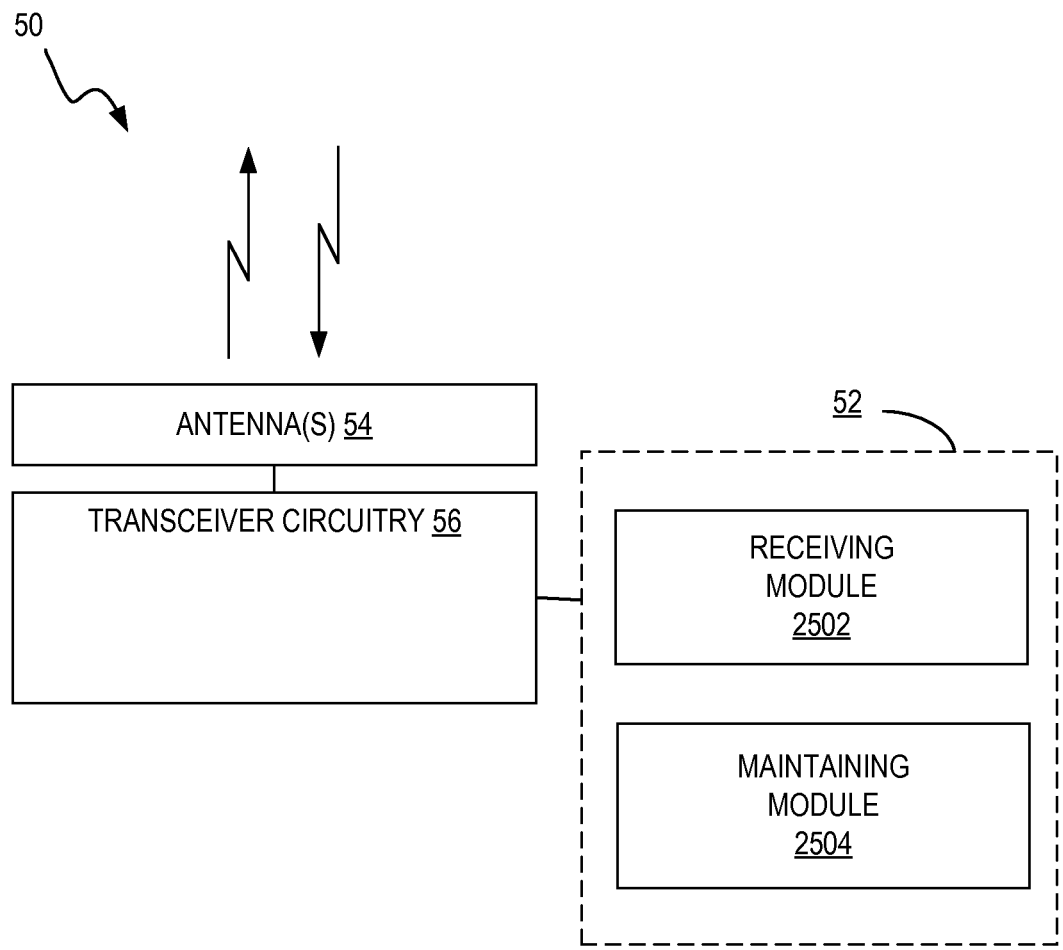
FIG. 25 is a block diagram illustrating a functional implementation of a wireless device, according to some embodiments.

FIG. 25 illustrates an example functional module or circuit architecture as may be implemented in a wireless device 50. The wireless device 50 at least functionally includes a receiving module 2502 for receiving information from the wireless communications network indicating a set of synchronization signals to use as synchronization sources and a maintaining module 2504 for maintaining synchronization with the wireless communication network based on detecting any one or more of the synchronization signals in the set of synchronization signals.

Figure 26:
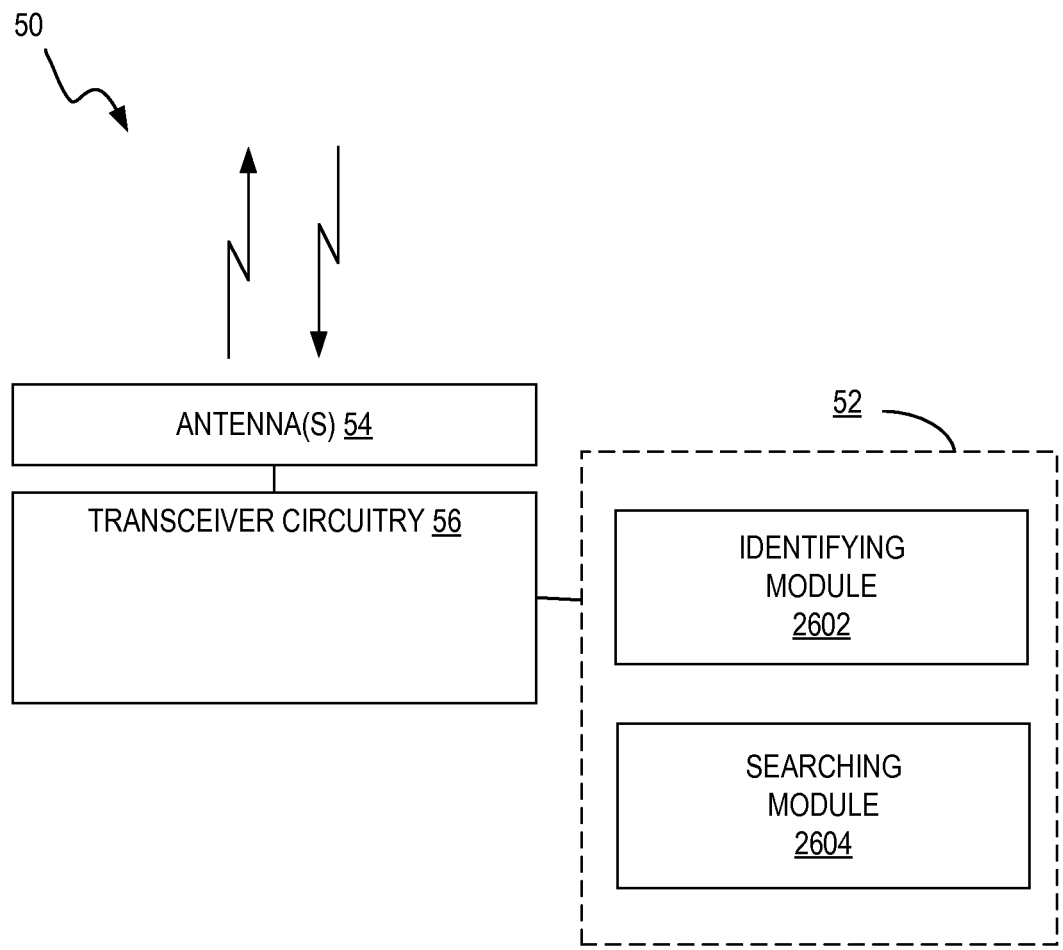
FIG. 26 is a block diagram illustrating another functional implementation of the wireless device, according to some embodiments.

FIG. 26 illustrates another example functional module or circuit architecture as may be implemented in a wireless device 50. The wireless device 50 at least functionally includes an identifying module 2602 for identifying a subset of radio resources to use when searching for synchronization signal transmissions from a neighboring transmission point, according to a known relationship to a subset of radio resources determined by the wireless device as being used by a first transmission point for synchronization signal transmission. The implementation also includes a searching module 2604 for searching for synchronization signal transmissions in the identified subset of radio resources.

Additional Implementation Examples

Two examples or alternative frequency block allocations based on the node ID have been discussed. In one alternative of the single transmission point case, adjacent frequency blocks are used for neighbors, while in another alternative single transmission point case, symmetric opposite blocks are allocated. These two examples or alternatively of frequency allocations can be exploited by different UE implementations in order to efficiently detect multiple beams and measure the MRSs from neighbor transmission points. In the first case, assuming the wireless device 50 is connected to Node ID=2, the wireless device 50 may start searching MRSs from neighbors in the sub-sequent frequency chunks right above and right below its own frequency chunk. In the second alternative, the wireless device 50 may start searching in the opposite symmetric bands to find the additional MRSs. The usage of one or the other alternative can be defined in the standards so that the UE implementation knows exactly how to search. However, in the case where both alternatives are possible configurations, the wireless device 50 can be informed of these via system information or dedicated signaling, so that the wireless device 50 knows how to search for neighbor MRSs.

Two examples or alternative time slots/subframes/OFDM symbol allocations based on the node ID were discussed for a multi-transmission point case. These two examples or alternative time-domain allocations can be exploited by different UE implementations in order to efficiently detect multiple beams and measure the MRSs from neighbor transmission points. In the first case, assuming the UE is connected to Node ID=2, the wireless device 50 may start searching MRSs from neighbor in the sub-sequent time slots/subframes/OFDM symbols right after and right before its own MRS slots, which are known via configuration. In the second alternative, the wireless device 50 may start searching in further time slots (e.g., N slots after its own slots) to find the additional MRSs. The usage of one or the other alternative can be defined in the standards so that the wireless device 50 implementation knows exactly how to search. However, in the case where both alternatives are possible configurations, the wireless device 50 can be informed via system information or dedicates signaling so that the wireless device 50 knows how to search for neighbor MRSs.

In some embodiments, a combination of the single and multiple transmission point techniques can be used for time and frequency scrambling. The allocation of node IDs may be done in a first alternative, so that MRSs transmitted from neighbor transmission points are using adjacent time slots and frequency blocks. This is attractive in the case transmission points are synchronized. In a second alternative, the opposite is done and time and/or frequency resources allocated for MRSs in neighbor transmission points are far apart from each other to reduce the collision probability.

Further Observations, Discussed Proposals and Example Implementations

RRM Measurements and Mobility Control in RRC CONNECTED

An LTE wireless device uses cell specific sync- and reference signals (PSS/SSS/CRS) both in IDLE and CONNECTED mode. Based on these signals, the LTE wireless device detects and measures cells; performs cell-reselection in IDLE; generates Radio Resource Management (RRM) measurements in CONNECTED; maintains sync for data reception; and may even use them as reference signals for data demodulation. While such re-use has certain advantages, it also limits the flexibility and evolution of the radio technology. For example, unicast transmission in CONNECTED mode should make extensive use of beamforming. On the other hand, beamforming is less beneficial in IDLE mode. Similarly, the synchronization and reference signals for IDLE mode operation (cell reselection) could potentially be sparser in time than those used for CONNECTED mode measurements and mobility. Due to these differences, it is recognized herein that wireless devices in IDLE and CONNECTED mode should use different synchronization and reference signals. Consequently, a "New Radio" (NR) wireless device will not (necessarily) use the same "serving cell" in IDLE and in CONNECTED mode.

RRC CONNECTED mobility has been discussed as having two levels of network controlled mobility: 1) RRC driven at 'cell' level; and 2) Zero/Minimum RRC involvement (e.g., at MAC/PHY). The definition of a cell may be further defined. RRC CONNECTED NR wireless device may perform RRM measurements and RRC driven mobility using these measurements. It is also recognized herein that an RRC CONNECTED NR wireless device does not (need to) know about 'cells', but rather only about beams.

RRM Measurements in NR

An LTE wireless device detects cells based on its PSS/SSS. An important property of these signals is that a neighbor cell to be detected does not need to be in-sync with the serving cell's signals. Secondly, the wireless device autonomously detects the neighbor cell IDs (PCI) from an acquired PSS/SSS, i.e., the network does not need to provide a neighbor cell list. Wireless devices typically detect and measure neighbor cells by sampling a short time window (e.g., 5 ms) on the target frequency (which may be the same or different from serving) and search (possibly offline) for PSS/SSS occurrences within that sample. For each detected PSS/SSS, the wireless device can also perform a measurement using the CRS corresponding to the PCI. The result of that action is a list of neighbor cell IDs and corresponding measurement sample.

The NR CONNECTED mode operation may rely substantially on beam forming. Besides the data and control information, the reference signals may also need to be beam-formed in order to enable a wireless device to detect, measure and report beams (rather than cells). One option would be to send both, cell- and beam-specific synchronization and reference signals. If the latter are dependent on the former, a wireless device would first have to detect the cell (as in LTE) based on its PSS/SSS like signals and subsequently attempt to detect one or more dependent beam reference signals (BRS). However, if the cell specific PSS/SSS is not beam-formed while the BRS is, the difference in received power will make the simultaneous reception challenging for the wireless device. Alternatively, the eNB could send the same cell specific PSS/SSS repeatedly with a number of different BRSs. However, this would increase the overhead and make it more difficult to use the PSS/SSS as unambiguous timing reference.

In order to keep the wireless device complexity for detecting beams equally simple as detecting neighbor cells in LTE, in some cases, the cell specific synchronization signals (PSS/SSS) may be replaced by beam-specific synchronization signals. These signals should have similar properties to the PSS/SSS with the primary difference being that they are only used in CONNECTED mode, and that their time/frequency allocation is not hard-coded in the standard. As indicated by the name, the beam-specific reference signals are intended to be beam-formed, and the network could use the increased allocation flexibility to stagger multiple signals within a subframe (e.g., one per OFDM symbol) and to transmit in different frequency allocations. The ID revealed by this sync signal is a "beam ID" rather than a cell ID. The wireless device should be able to perform RRM measurements on these signals and, hence, the signals are denoted MRS.

Whether several MRSs are beam-formed within a sector or whether a single MRS covers the entire sector depends on the network configuration and is transparent to the wireless device. In some cases, for NR CONNECTED mode, cell specific cell and reference signals are replaced by beam-specific MRSs. In other cases, an RRC CONNECTED wireless device detects and measures individual beams based on these measurement reference signals. Even though a wireless device will typically detect several such MRSs originating from the same transmission point, there may be potential benefits in allowing the wireless device to identify groups of beams and possibly define it as a "cell". In some cases, an RRC CONNECTED wireless device should not be assumed to identify groups of beams.

RRC Level Mobility in NR

In LTE, the RRCConnectionReconfiguration with mobilityControlInfo comprises, in particular, the target cell ID. In order to execute the handover, the wireless device shall detect the PSS/SSS carrying that PCI and establish downlink synchronization with that signal.

In principle, one could follow the same approach in NR. However, due to beamforming, the coverage area of the synchronization signals (MRS) becomes potentially smaller compared to the coverage area of a cell. An RRC based mobility upon each beam change should be avoided.

In some cases, mobility across the beams originating from one transmission point and among the beams of tightly synchronized transmission points of the same eNB (digital unit) should not require any RRC reconfigurations. To achieve this, the network should configure the wireless device with a set of serving MRSs. If the wireless device's MRS-search reveals several MRS IDs listed in the "serving MRS set", it should choose the strongest one as timing reference. Provided that the transmitted MRSs are in tight synchronization, the network does not need to know which of the MRSs in the set the wireless device uses instantaneously.

In some cases, upon connection establishment and during RRC level mobility, the network may configure the NR wireless device with a "set of serving MRSs" that are transmitted in tight synchronization and among which the wireless device may use any as timing reference. The wireless device should be able to distinguish beams from its serving and neighbor eNBs, e.g., to trigger mobility events and measurement reports. The serving MRSs can be used for that purpose so that every beam that is not in its serving MRS set is a neighbor MRS.

It should also be noted that the MRSs are not the only signal based on which the wireless device may maintain synchronization with the network. While the PSS/SSS-like MRS enables the wireless device to acquire initial synchronization, the demodulation reference signals (DM-RS) allow a wireless device to maintain accurate synchronization while receiving data. This is similar to LTE, where wireless devices may, e.g., use CRS to maintain sync even in between the PSS/SSS occasions.

It has been observed that, in addition to the "set of serving MRSs", the wireless device may use its DMRS for maintaining accurate time/frequency synchronization. In LTE, all physical channels are scrambled with the cell ID (which the wireless device acquired from the PSS/SSS). This scrambling ensures that wireless devices can distinguish transmissions of the serving cell from transmissions of the neighbor cells. Furthermore, the different scrambling sequences randomize the neighbor cells' interference.

Since the MRS is beam specific, and since the chosen MRS within the "serving MRS set" should be transparent to the network, one cannot use the MRS ID for that scrambling. At first glance, this may appear to be a problem. But MRSs are, anyways, only intended for operation in CONNECTED mode where the wireless device should operate in accordance with a dedicated RRC configuration. Hence, the scrambling ID to be used by RRC Connected wireless devices should be conveyed by dedicated signaling rather than derived from a synchronization signal. Therefore, in some cases, the scrambling ID to be used by RRC Connected wireless devices is conveyed by dedicated RRC signaling.

In sum, additional embodiments include: for NR CONNECTED mode, cell specific cell and reference signals are replaced by beam-specific measurement reference signals (Proposal 1); an RRC CONNECTED wireless device detects and measures individual beams based on these measurement reference signals (Proposal 2). In some embodiments, an RRC CONNECTED wireless device is not required (nor able) to associate detected beams with each other or with a cell (Proposal 3).

According to some embodiments, mobility across the beams originating from one transmission point and among the beams of tightly synchronized transmission points of the same eNB (digital unit) should not require any RRC reconfigurations (Proposal 4). Upon connection establishment and during RRC level mobility, the network may configure the NR wireless device with a "set of serving MRSs" that are transmitted in tight synchronization and among which the wireless device may use any as timing reference (Proposal 5). The scrambling ID to be used by RRC Connected wireless devices may be conveyed by dedicated RRC signaling (Proposal 6).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a beam-based transmission point in a wireless communication network comprising two or more beam-based transmission points, the method comprising:
   selecting radio resources in dependence on an assigned identifier or other configured value, wherein the transmission point derives a time shift and/or frequency shift as a function of the assigned identifier or other configured value, wherein the time shift and/or frequency shift control the radio resources selected by the transmission point for transmission of the synchronization signals; and
   transmitting synchronization signals using the selected radio resources, the synchronization signals being transmitted in association with two or more beams transmitted by the transmission point.

2. The method of claim 1, wherein the transmission point beamforms transmissions according to a configured set of beams and transmits a synchronization signal for each beam, the synchronization signal enabling a receiving wireless device to perform synchronization measurements and/or received signal strength or quality measurements.

3. The method of claim 1, wherein transmitting the synchronization signals comprises transmitting a synchronization signal for each beam, each such synchronization signal being based on a different synchronization sequence selected from a set of synchronization sequences configured for use by the transmission point, and wherein each synchronization signal serves as a signal synchronization and/or measurement source for wireless devices operating within a coverage area of the respective beam.

4. The method of claim 1, wherein the transmission point beamforms transmissions according to the configured set of beams, and wherein the method comprises performing beamforming transmissions of the synchronization signals according to a particular beam sweeping pattern or timing, and selecting or configuring the particular beam sweeping pattern or timing in dependence on the assigned identifier or other configured value at the transmission point.

5. The method of claim 1, wherein the transmission point uses a radio frame structure, wherein each radio frame comprises a number of physical resource blocks (PRBs) defined according to a time/frequency grid, and wherein selecting the radio resources comprises selecting the radio resources by choosing the PRBs to use for transmission of the synchronization signals and/or wherein the synchronization signals comprise Mobility Reference Signals (MRSs), each MRS comprising a Time Synchronization Signal (TSS) and a Beam Reference Signal (BRS), and wherein each BRS uniquely identifies a beam in a configured set of beams used by the transmission point.

6. A method of operation in a wireless device configured for operation in a wireless communication network comprising two or more beam-based transmission points, wherein each of the two or more beam-based transmission points transmits synchronization signals corresponding to beams transmitted by the respective transmission point, the method comprising:
   receiving information from the wireless communications network indicating a set of synchronization signals to use as synchronization sources, wherein each of the two or more beam-based transmission points is configured to select the radio resources used for synchronization signal transmission in dependence on a value of an assigned identifier, and wherein the radio resources selected by each of the two or more transmission points for transmission of the synchronization signals are derived by a time shift and/or frequency shift as a function of the assigned identifier; and
   maintaining synchronization with the wireless communication network based on detecting any one or more of the synchronization signals in the set of synchronization signals.

7. The method of claim 6, wherein maintaining synchronization with the wireless communication network comprises using a strongest or highest-quality one of the synchronization signals as the synchronization source.

8. The method of claim 6, further comprising:
   identifying a subset of radio resources to use when searching for synchronization signal transmissions from a neighboring transmission point, according to a known relationship to a subset of radio resources being used by a first transmission point for synchronization signal transmission; and
   searching for synchronization signal transmissions in the identified subset of radio resources.

9. The method of claim 8, wherein the known relationship comprises a known offset in time and/or frequency, and wherein identifying the subset of radio resources comprises applying the known offset in time and/or frequency to a time and/or frequency associated with the subset of radio resources used by the first transmission point for synchronization signal transmission.

10. A beam-based transmission point in a wireless communication network comprising two or more beam-based transmission points, the beam-based transmission point comprising:
communication interface circuitry configured for communicating within the wireless communication network;
transceiver circuitry configured for transmitting signals from an associated array of antennas or antenna element; and
processing circuitry operatively associated with the communication interface circuitry and transceiver circuitry and configured to:
select radio resources in dependence on an assigned identifier or other configured value, wherein a time shift and/or frequency shift is derived as a function of the assigned identifier or other configured value, wherein the time shift and/or frequency shift control the radio resources selected by the transmission point for transmission of the synchronization signals; and
transmit synchronization signals using the selected radio resources, the synchronization signals being transmitted in association with two or more beams transmitted by the transmission point.

11. The beam-based transmission point of claim 10, wherein the processing circuitry is configured to beamform transmissions according to a configured set of beams and transmits a synchronization signal for each beam, the synchronization signal enabling a receiving wireless device to perform synchronization measurements and/or received-signal strength or quality measurements.

12. The beam-based transmission point of claim 10, wherein the processing circuitry is configured to transmit the synchronization signals by transmitting a synchronization signal for each beam, each such synchronization signal being based on a different synchronization sequence selected from a set of synchronization sequences configured for use by the transmission point, and wherein each synchronization signal serves as a signal synchronization and/or measurement source for wireless devices operating within a coverage area of the respective beam.

13. The beam-based transmission point of claim 10, wherein the processing circuitry is configured to:
beamform transmissions according to the configured set of beams;
perform beamforming transmissions of the synchronization signals according to a particular beam sweeping pattern or timing; and
select or configure the particular beam sweeping pattern or timing in dependence on the assigned identifier or other configured value at the transmission point.

14. The beam-based transmission point of claim 10, wherein the processing circuitry is configured to use a radio frame structure, wherein each radio frame comprises a number of physical resource blocks (PRBs) defined according to a time/frequency grid, and to select the radio resources by selecting the radio resources by choosing the PRBs to use for transmission of the synchronization signals.

15. The beam-based transmission point of claim 10, wherein the synchronization signals comprise Mobility Reference Signals (MRSs), each MRS comprising a Time Synchronization Signal (TSS) and a Beam Reference Signal (BRS), and wherein each BRS uniquely identifies a beam in a configured set of beams used by the transmission point.

16. A wireless device configured for operation in a wireless communication network comprising two or more beam-based transmission points, wherein each of the two or more beam-based transmission points transmits synchronization signals corresponding to beams transmitted by the respective transmission point, the wireless device comprising:
transceiver circuitry configured for communicating with the wireless communication network; and
processing circuitry operatively associated with the transceiver circuitry and configured to:
receive information from the wireless communications network indicating a set of synchronization signals to use as synchronization sources, wherein each of the two or more beam-based transmission points is configured to select the radio resources used for synchronization signal transmission in dependence on a value of an assigned identifier, and wherein the radio resources selected by each of the two or more transmission points for transmission of the synchronization signals are derived by a time shift and/or frequency shift as a function of the assigned identifier; and
maintain synchronization with the wireless communication network based on detecting any one or more of the synchronization signals in the set of synchronization signals.

17. The wireless device of claim 16, wherein the processing circuitry is configured to maintain synchronization with the wireless communication network by using a strongest or highest-quality one of the synchronization signals as the synchronization source.

18. The wireless device of claim 16, wherein the processing circuitry is configured to report a signal strength or other measurement for one or more synchronizations signals that are detected by the wireless device but not included in the set of synchronization signals.

19. The wireless device of claim 16, wherein the processing circuitry is further configured to:
identify a subset of radio resources to use when searching for synchronization signal transmissions from a neighboring transmission point, according to a known relationship to a subset of radio resources being used by a first transmission point for synchronization signal transmission; and
search for synchronization signal transmissions in the identified subset of radio resources.

20. The wireless device of claim 19, wherein the known relationship comprises a known offset in time and/or frequency, and wherein the processing circuitry is configured to identify the subset of radio resources by applying the known offset in time and/or frequency to a time and/or frequency associated with the subset of radio resources used by the first transmission point for synchronization signal transmission.

* * * * *